(12) United States Patent
McFalls et al.

(10) Patent No.: US 8,205,941 B2
(45) Date of Patent: Jun. 26, 2012

(54) ACTIVE HEAD RESTRAINT FOR A VEHICLE SEAT

(75) Inventors: Bob L. McFalls, Shelby Township, MI (US); Charles E. Steffens, Jr., Washington, MI (US); James M. McGowan, Shelby Township, MI (US); Michael W. Jagenow, Almont, MI (US); Matthew J. McCann, Almont, MI (US); John P. Wallner, Rochester Hills, MI (US)

(73) Assignee: TRW Vehicle Safety Systems Inc., Washington, MI (US)

( * ) Notice: Subject to any disclaimer, the term of this patent is extended or adjusted under 35 U.S.C. 154(b) by 293 days.

(21) Appl. No.: 12/510,502

(22) Filed: Jul. 28, 2009
(Under 37 CFR 1.47)

(65) Prior Publication Data

US 2010/0026061 A1 Feb. 4, 2010

Related U.S. Application Data

(60) Provisional application No. 61/137,525, filed on Jul. 30, 2008.

(51) Int. Cl.
*B60N 2/427* (2006.01)
(52) U.S. Cl. .................................. 297/216.12
(58) Field of Classification Search ............. 297/216.12, 297/216.1, 391
See application file for complete search history.

(56) References Cited

U.S. PATENT DOCUMENTS

| | | | |
|---|---|---|---|
| 4,534,532 A * | 8/1985 | Parizet | 248/371 |
| 4,889,300 A * | 12/1989 | Gibson et al. | 248/97 |
| 5,181,763 A | 1/1993 | Dellanno et al. | |
| 5,205,585 A | 4/1993 | Reuber et al. | |
| 5,290,091 A | 3/1994 | Dellanno et al. | |
| 5,378,043 A | 1/1995 | Viano et al. | |
| 5,590,929 A | 1/1997 | Hamelin | |
| 5,613,736 A | 3/1997 | Schaked et al. | |
| 5,681,081 A | 10/1997 | Lindner et al. | |
| 5,694,320 A | 12/1997 | Breed | |
| 5,772,280 A | 6/1998 | Massara | |
| 5,772,281 A | 6/1998 | Massara | |
| 5,795,019 A | 8/1998 | Wieclawski | |
| 5,806,933 A | 9/1998 | Tsui et al. | |

(Continued)

FOREIGN PATENT DOCUMENTS

DE 29601479 U1 1/1996

(Continued)

*Primary Examiner* — Milton Nelson, Jr.
(74) *Attorney, Agent, or Firm* — Tarolli, Sundheim, Covell & Tummino LLP

(57) ABSTRACT

A head restraint (14) for helping to protect an occupant (60) of a vehicle seat (20) includes a base frame (150) connected to the vehicle seat. A cushion carrier (350) is supported on the base frame (150) by a track assembly (440) that facilitates movement of the cushion carrier (350) relative to the base frame (150) along a deployment axis (18) from a non-deployed condition to a deployed condition. The track assembly (440) includes a fixed track member (182) that forms a portion of the base frame (150). The fixed track member (182) includes spaced axially extending beam portions (190) with opposing surfaces (200) that define a channel (184) between the beam portions (190). The track assembly (440) also includes a sliding track member (370) that forms a portion of the cushion carrier (350). The sliding track member (370) includes a sliding frame (372) positioned in the channel (184) and having portions (442) positioned in sliding contact with portions (444) on the opposing surfaces (200) defining the channel (184).

24 Claims, 16 Drawing Sheets

U.S. PATENT DOCUMENTS

| | | |
|---|---|---|
| 5,820,211 A | 10/1998 | Heilig et al. |
| 5,823,619 A | 10/1998 | Heilig et al. |
| 5,836,648 A | 11/1998 | Karschin et al. |
| 5,842,738 A | 12/1998 | Knoll et al. |
| 5,860,703 A | 1/1999 | Courtois et al. |
| 5,882,071 A | 3/1999 | Fohl |
| 5,904,405 A | 5/1999 | Wu |
| 5,927,803 A | 7/1999 | Hehl et al. |
| 5,927,804 A | 7/1999 | Cuevas |
| 5,934,750 A | 8/1999 | Fohl |
| 5,938,279 A | 8/1999 | Schubring et al. |
| 5,947,543 A | 9/1999 | Hubbard |
| 5,961,182 A | 10/1999 | Dellanno |
| 6,019,424 A | 2/2000 | Ruckert |
| 6,022,074 A | 2/2000 | Swedenklef |
| 6,024,405 A | 2/2000 | MacAndrew et al. |
| 6,024,406 A | 2/2000 | Charras et al. |
| 6,033,018 A | 3/2000 | Fohl |
| 6,042,145 A | 3/2000 | Mitschelen et al. |
| 6,068,337 A | 5/2000 | De Filippo |
| 6,079,776 A | 6/2000 | Breitner et al. |
| 6,082,817 A | 7/2000 | Muller |
| 6,095,550 A | 8/2000 | O'Loughlin et al. |
| 6,149,232 A | 11/2000 | Meyer |
| 6,179,379 B1 | 1/2001 | Andersson |
| 6,213,548 B1 | 4/2001 | Van Wynsberghe et al. |
| 6,213,549 B1 | 4/2001 | Wieclawski |
| 6,217,118 B1 | 4/2001 | Heilig |
| 6,250,714 B1 | 6/2001 | Nakano et al. |
| 6,273,511 B1 | 8/2001 | Wieclawski |
| 6,296,306 B1 | 10/2001 | Specht et al. |
| 6,312,050 B1 | 11/2001 | Eklind |
| 6,340,206 B1 | 1/2002 | Andersson et al. |
| 6,364,414 B1 | 4/2002 | Specht |
| 6,416,125 B1 | 7/2002 | Shah et al. |
| 6,447,068 B1 | 9/2002 | Anderson et al. |
| 6,478,373 B1 | 11/2002 | Hake et al. |
| 6,513,871 B2 | 2/2003 | Bartels |
| 6,550,856 B1 | 4/2003 | Ganser et al. |
| 6,550,865 B2 | 4/2003 | Cho |
| 6,565,150 B2 | 5/2003 | Fischer et al. |
| 6,568,753 B1 | 5/2003 | Watanabe |
| 6,568,754 B1 | 5/2003 | Norton et al. |
| 6,572,186 B1 | 6/2003 | Fischer et al. |
| 6,607,242 B2 | 8/2003 | Estrada et al. |
| 6,623,073 B2 | 9/2003 | Schafer et al. |
| 6,631,949 B2 | 10/2003 | Humer et al. |
| 6,631,955 B2 | 10/2003 | Humer et al. |
| 6,655,733 B2 | 12/2003 | Humer et al. |
| 6,688,697 B2 | 2/2004 | Baumann et al. |
| 6,715,829 B2 | 4/2004 | Svantesson et al. |
| 6,746,078 B2 | 6/2004 | Breed |
| 6,749,256 B1 | 6/2004 | Klier et al. |
| 6,767,054 B2 | 7/2004 | Håland et al. |
| 6,767,064 B2 | 7/2004 | Veine et al. |
| 6,779,840 B1 | 8/2004 | Farquhar et al. |
| 6,789,845 B2 | 9/2004 | Farquhar et al. |
| 6,789,846 B2 | 9/2004 | Humer et al. |
| 6,802,562 B1 | 10/2004 | Hake et al. |
| 6,805,411 B2 | 10/2004 | Gramss et al. |
| 6,824,212 B2 | 11/2004 | Malsch et al. |
| 6,837,541 B2 | 1/2005 | Farquhar et al. |
| 6,840,560 B2 | 1/2005 | Flogard |
| 6,863,343 B2 | 3/2005 | Pal et al. |
| 6,871,913 B2 | 3/2005 | Malsch et al. |
| 6,890,028 B2 | 5/2005 | Pal et al. |
| 6,890,029 B2 | 5/2005 | Svantesson |
| 6,955,397 B1 | 10/2005 | Humer |
| 6,957,858 B2 | 10/2005 | Yetukuri et al. |
| 6,983,989 B1 | 1/2006 | Veine et al. |
| 6,983,996 B2 | 1/2006 | Svantesson |
| 6,991,288 B2 | 1/2006 | Farquhar et al. |
| 7,017,989 B2 | 3/2006 | Yamaguchi et al. |
| 7,044,544 B2 | 5/2006 | Humer et al. |
| 7,048,334 B2 | 5/2006 | Pal et al. |
| 7,070,205 B2 | 7/2006 | Becker et al. |
| 7,070,235 B2 | 7/2006 | Schilling et al. |
| 7,073,856 B2 | 7/2006 | Akaike et al. |
| 7,073,863 B1 | 7/2006 | Low et al. |
| 7,077,472 B2 | 7/2006 | Steffens, Jr. |
| 7,097,242 B2 | 8/2006 | Farquhar et al. |
| 7,104,602 B2 | 9/2006 | Humer et al. |
| 7,108,320 B2 | 9/2006 | Schafer et al. |
| 7,111,901 B2 | 9/2006 | Schlierf et al. |
| 7,118,174 B2 | 10/2006 | Lee |
| 7,121,625 B2 | 10/2006 | Malsch et al. |
| 7,134,716 B2 | 11/2006 | Wieclawsk |
| 7,134,717 B2 | 11/2006 | Thunnissen et al. |
| 7,137,668 B2 | 11/2006 | Kreitler |
| 7,140,687 B2 | 11/2006 | Hoekstra et al. |
| 7,152,928 B2 | 12/2006 | Yetukuri et al. |
| 7,159,934 B2 | 1/2007 | Farquhar et al. |
| 7,185,950 B2 | 3/2007 | Pettersson et al. |
| 7,188,894 B2 | 3/2007 | Humer et al. |
| 7,195,313 B2 | 3/2007 | Hippel et al. |
| 7,204,552 B2 | 4/2007 | Ishizuka |
| 7,226,105 B2 | 6/2007 | Christopher |
| 7,229,133 B2 | 6/2007 | Maddelein et al. |
| 7,232,187 B1 | 6/2007 | Sundararajan et al. |
| 7,237,838 B2 | 7/2007 | Hoffmeister et al. |
| 7,284,793 B2 | 10/2007 | Kluhspies et al. |
| 7,293,829 B2 | 11/2007 | Thiel et al. |
| 7,325,869 B2 | 2/2008 | Braune |
| 7,344,191 B2 | 3/2008 | Schilling et al. |
| 7,484,796 B2 | 2/2009 | Fischer et al. |
| 7,621,598 B2 * | 11/2009 | Humer et al. ................. 297/410 |
| 2001/0040396 A1 | 11/2001 | Kreuels et al. |
| 2002/0053819 A1 | 5/2002 | Itoh |
| 2002/0093231 A1 * | 7/2002 | Estrada et al. ........... 297/216.12 |
| 2002/0195846 A1 | 12/2002 | Masuda et al. |
| 2003/0030309 A1 | 2/2003 | Pal et al. |
| 2003/0057748 A1 | 3/2003 | Schafer et al. |
| 2003/0122410 A1 | 7/2003 | Fischer et al. |
| 2003/0227199 A1 | 12/2003 | Yoshizawa et al. |
| 2004/0070240 A1 | 4/2004 | Håland et al. |
| 2004/0130191 A1 | 7/2004 | Lomagno et al. |
| 2004/0174053 A1 | 9/2004 | Schmale |
| 2004/0217641 A1 | 11/2004 | Lampke et al. |
| 2005/0077762 A1 | 4/2005 | Kraemer et al. |
| 2005/0093349 A1 | 5/2005 | Low et al. |
| 2005/0127726 A1 | 6/2005 | Schilling et al. |
| 2005/0212333 A1 * | 9/2005 | Mally et al. ............... 296/203.03 |
| 2005/0264051 A1 | 12/2005 | Lawall et al. |
| 2005/0280296 A1 | 12/2005 | Ohchi et al. |
| 2006/0006708 A1 | 1/2006 | Becker et al. |
| 2006/0006709 A1 | 1/2006 | Uno et al. |
| 2006/0022498 A1 * | 2/2006 | Freijy ........................ 297/344.1 |
| 2006/0095235 A1 | 5/2006 | Furtado et al. |
| 2006/0103189 A1 | 5/2006 | Humer et al. |
| 2006/0103190 A1 | 5/2006 | Humer et al. |
| 2006/0119150 A1 | 6/2006 | Hoffmann |
| 2006/0127726 A1 | 6/2006 | Wang et al. |
| 2006/0175881 A1 | 8/2006 | Akaike et al. |
| 2006/0186713 A1 | 8/2006 | Breed |
| 2006/0250001 A1 | 11/2006 | Becker et al. |
| 2006/0255632 A1 | 11/2006 | Sugimoto |
| 2006/0267384 A1 | 11/2006 | Fischer et al. |
| 2006/0273636 A1 | 12/2006 | Sugimoto |
| 2006/0279114 A1 | 12/2006 | Toda et al. |
| 2006/0284470 A1 | 12/2006 | Ogawa et al. |
| 2007/0024096 A1 | 2/2007 | Sakai |
| 2007/0052265 A1 | 3/2007 | Sakai et al. |
| 2007/0085697 A1 | 4/2007 | Breed |
| 2007/0096514 A1 | 5/2007 | Haglund et al. |
| 2007/0096515 A1 | 5/2007 | Jammalamadaka et al. |
| 2007/0096516 A1 | 5/2007 | Heeg et al. |
| 2007/0135982 A1 | 6/2007 | Breed et al. |
| 2007/0145725 A1 | 6/2007 | Chen |
| 2007/0145796 A1 | 6/2007 | Sakai |
| 2007/0158933 A1 | 7/2007 | Siemiantkowski |
| 2007/0176473 A1 | 8/2007 | Sakai |
| 2007/0188004 A1 | 8/2007 | Browne et al. |
| 2007/0205643 A1 | 9/2007 | Fujita et al. |
| 2007/0208474 A1 | 9/2007 | Bertele et al. |
| 2007/0216211 A1 | 9/2007 | Mori |
| 2007/0241593 A1 | 10/2007 | Woerner |
| 2007/0246989 A1 | 10/2007 | Brockman |

| | | | |
|---|---|---|---|
| 2007/0257528 A1 | 11/2007 | Akaike et al. | |
| 2007/0262631 A1 | 11/2007 | Hartlaub | |
| 2008/0001447 A1 | 1/2008 | Humer et al. | |
| 2008/0007106 A1 | 1/2008 | McMillen et al. | |
| 2009/0058161 A1 | 3/2009 | Meert | |
| 2009/0069985 A1 | 3/2009 | Sakai et al. | |

FOREIGN PATENT DOCUMENTS

| | | |
|---|---|---|
| DE | 29603467 U1 | 2/1996 |
| DE | 29614238 U1 | 8/1996 |
| DE | 29614978 U1 | 8/1996 |
| DE | 10033913 A1 | 7/2000 |
| DE | 20021127 U1 | 12/2000 |
| DE | 10202598 B4 | 1/2002 |
| DE | 10215137 B4 | 4/2002 |
| DE | 10220027 C1 | 5/2002 |
| DE | 10307994 A1 | 2/2003 |
| DE | 10345689 A1 | 10/2003 |
| DE | 10346397 A1 | 10/2003 |
| DE | 10351367 B3 | 11/2003 |
| DE | 10355773 B3 | 11/2003 |
| DE | 20321324 U1 | 12/2003 |
| DE | 20321461 U1 | 12/2003 |
| DE | 20321462 U1 | 12/2003 |
| DE | 102004004268 A1 | 1/2004 |
| DE | 102004027028 A1 | 6/2004 |
| DE | 102004037060 A1 | 7/2004 |
| DE | 102004037320 A1 | 8/2004 |
| DE | 102004059237 B3 | 12/2004 |
| DE | 112005000915 T5 | 4/2005 |
| DE | 102005031264 A1 | 7/2005 |
| DE | 202005015000 U1 | 9/2005 |
| DE | 102005051109 B4 | 10/2005 |
| DE | 102006004905 A1 | 2/2006 |
| DE | 102006016270 A1 | 4/2006 |
| DE | 112006000041 A1 | 4/2006 |
| DE | 202006005357 U1 | 4/2006 |
| DE | 212006000002 U1 | 4/2006 |
| DE | 102007002615 B3 | 1/2007 |
| DE | 20321461 | 6/2007 |
| EP | 0491744 | 4/1993 |
| EP | 0974484 | 12/2002 |
| EP | 1077155 | 8/2003 |
| EP | 1202871 | 11/2003 |
| EP | 1535794 | 6/2005 |
| EP | 1316471 | 10/2005 |
| EP | 1526982 | 3/2006 |
| JP | 7067744 A2 | 3/1995 |
| JP | 11321502 A2 | 5/1998 |
| JP | 26321450 A2 | 5/2005 |
| JP | 26335310 A2 | 6/2005 |
| JP | 27022450 A2 | 7/2005 |
| JP | 27030676 A2 | 7/2005 |
| JP | 27055500 A2 | 8/2005 |
| JP | 27137219 A2 | 11/2005 |
| JP | 27168751 A2 | 12/2005 |
| WO | WO2004039626 A1 | 5/2004 |
| WO | WO2004082985 A1 | 9/2004 |
| WO | WO2009030408 A2 | 3/2009 |
| WO | WO2009030414 A2 | 3/2009 |
| WO | WO2009030415 A2 | 3/2009 |
| WO | WO2009030416 A2 | 3/2009 |

* cited by examiner

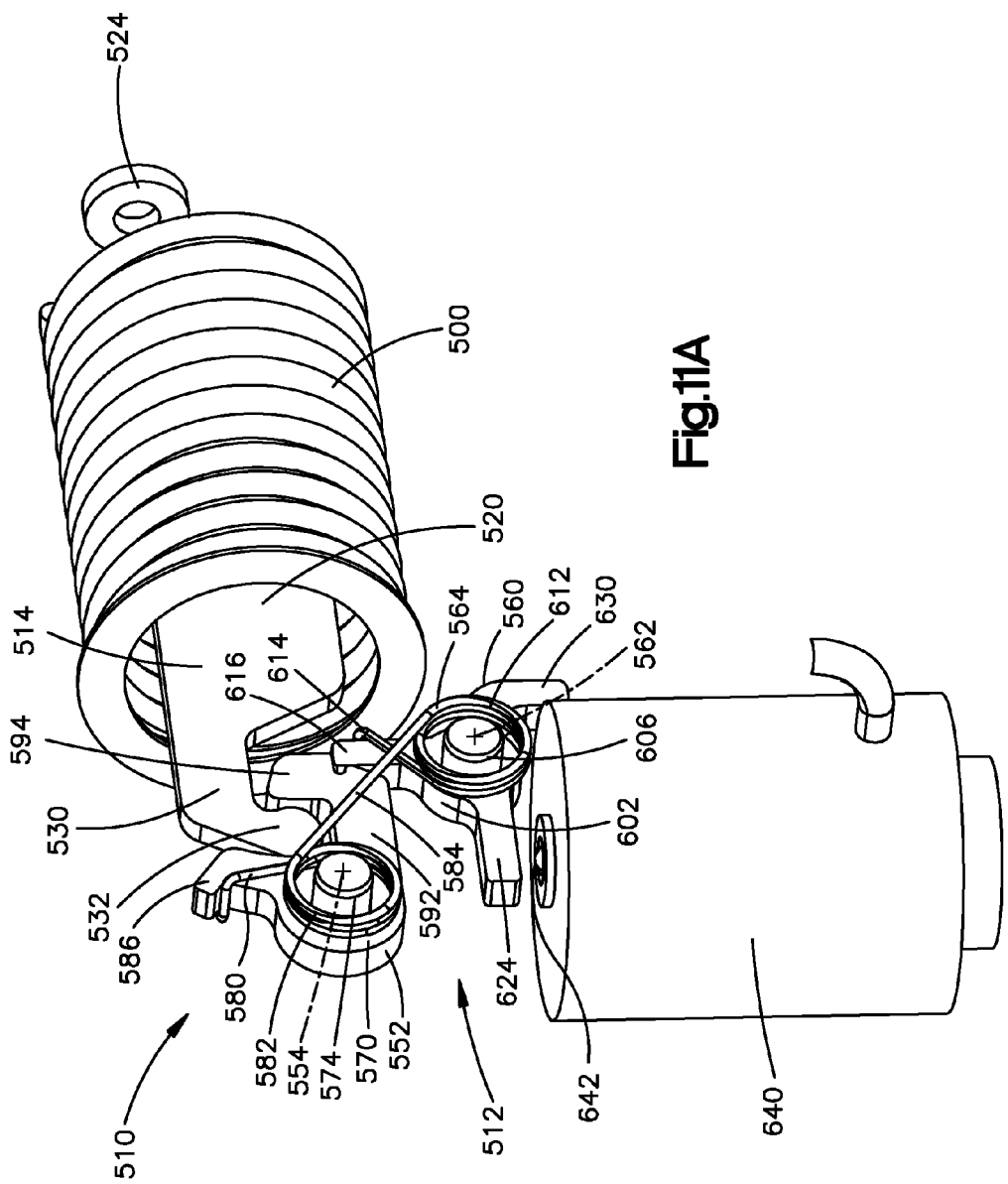

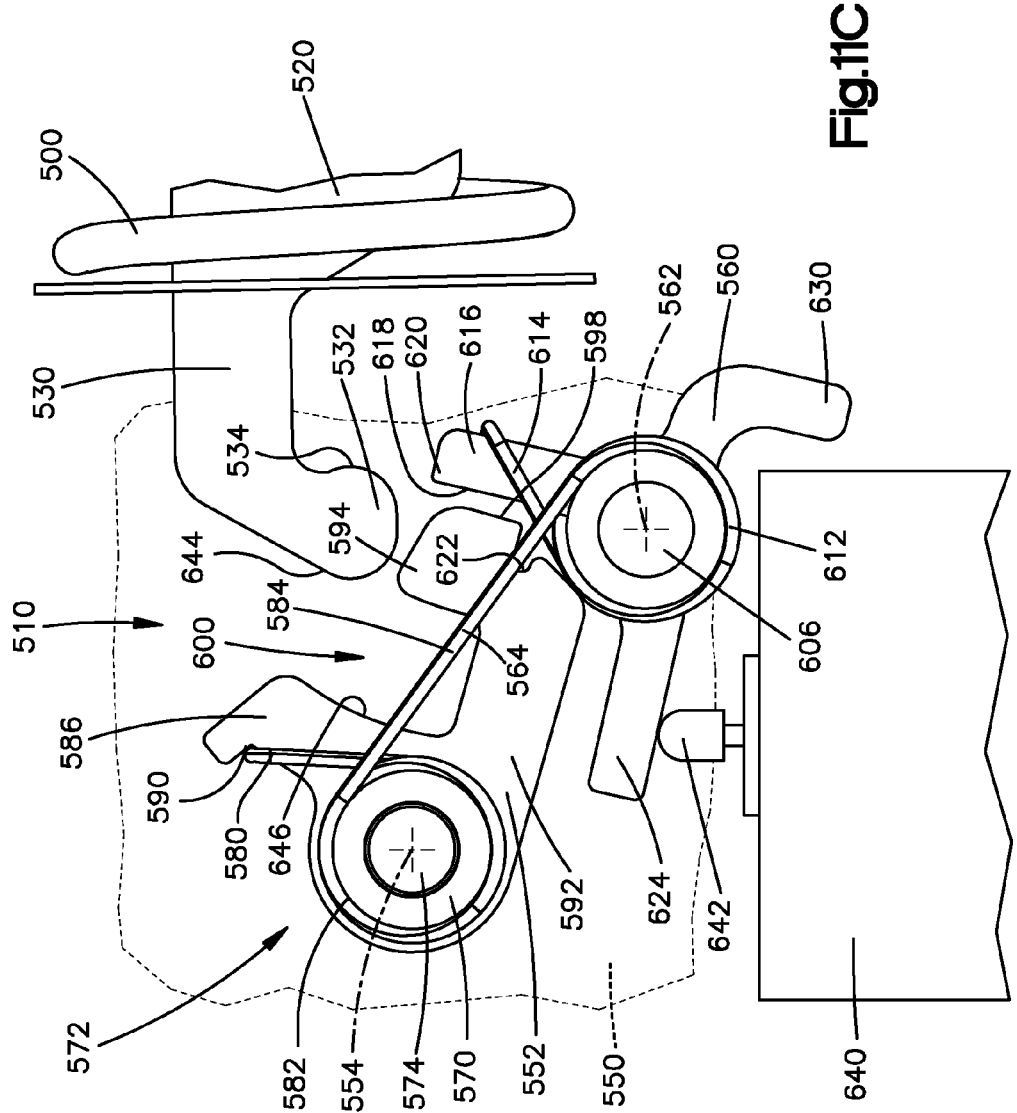

US 8,205,941 B2

ACTIVE HEAD RESTRAINT FOR A VEHICLE SEAT

RELATED APPLICATIONS

This application claims the benefit of U.S. Provisional Application Ser. No. 61/137,525, filed on Jul. 30, 2008.

FIELD OF THE INVENTION

The present invention relates to an active head restraint for a vehicle seat. The active head restraint helps protect an occupant of the vehicle.

BACKGROUND OF THE INVENTION

It is known to provide an apparatus, such as an occupant restraint (e.g., seatbelt), inflatable vehicle occupant protection device (e.g., air bag), impact absorbing structure (e.g., padded or collapsible structures), or a combination thereof, for helping to protect an occupant of a vehicle. One particular apparatus is a head restraint positioned above or at the upper extent of a seat back of a vehicle seat. Head restraints may be adjustable in order to place the head restraint in a desired position relative to differently sized occupants of the vehicle seat. The head restraint may be effective to help protect the occupant of the vehicle seat upon the occurrence of an event for which occupant protection is desired, such as a vehicle impact (e.g., a rear impact). When such an event occurs, the head restraint helps protect the occupant by helping to absorb impacts with the head restraint and by helping to restrict or limit movement of the occupant's head and neck.

SUMMARY OF THE INVENTION

The present invention relates to a head restraint for helping to protect an occupant of a vehicle seat. The head restraint includes a base frame connected to the vehicle seat. A cushion carrier is supported on the base frame by a track assembly that facilitates movement of the cushion carrier relative to the base frame along a deployment axis from a non-deployed condition to a deployed condition. The track assembly includes a fixed track member that forms a portion of the base frame. The fixed track member includes spaced axially extending beam portions with opposing surfaces that define a channel between the beam portions. The track assembly also includes a sliding track member that forms a portion of the cushion carrier. The sliding track member includes a sliding frame positioned in the channel and having portions positioned in sliding contact with portions on the opposing surfaces defining the channel.

According to one aspect of the present invention, a drive spring biases the cushion carrier toward the deployed condition. A release mechanism is actuatable to release the cushion carrier to move to the deployed condition. The release mechanism comprises all metal components that withstand the bias the drive spring places on the cushion carrier so as to help prevent fatigue and creep of plastic components of the head restraint.

According to another aspect of the present invention, a drive spring biases the cushion carrier relative to the base frame to move from the non-deployed condition toward the deployed condition. The drive spring is configured and arranged to deploy the cushion carrier initially with a first force versus displacement characteristic and subsequently with a second force versus displacement characteristic.

According to another aspect of the present invention, a release mechanism is actuatable to release the cushion carrier to move relative to the base frame toward the deployed condition. The release mechanism includes a latch member having a latching condition in which the latch member maintains the cushion carrier in the non-deployed condition against the bias of the drive spring. The release mechanism also includes a blocking member has a blocking condition maintaining the latch member in the latching condition. The release mechanism further includes a single, double coil spring for biasing the latch member toward the latching condition and simultaneously biasing the blocking member toward the blocking condition.

According to a further aspect of the present invention, a non-return mechanism maintains the cushion carrier at the forwardmost position attained during deployment. The non-return mechanism includes a rack associated with the cushion carrier. A non-return pawl is engagable with the rack to help block movement of the cushion carrier. A portion of the non-return mechanism is configured and arranged to permit the cushion carrier to be reset to the non-deployed condition without manually maintaining the position of the non-return pawl in a non-blocking condition.

BRIEF DESCRIPTION OF THE DRAWINGS

The foregoing and other features of the present invention will become apparent to one skilled in the art to which the present invention relates upon consideration of the following description of the invention with reference to the accompanying drawings, in which:

FIGS. 11A-11C illustrate portions of the apparatus in different conditions;

DESCRIPTION OF THE PREFERRED EMBODIMENTS

Figure 1:
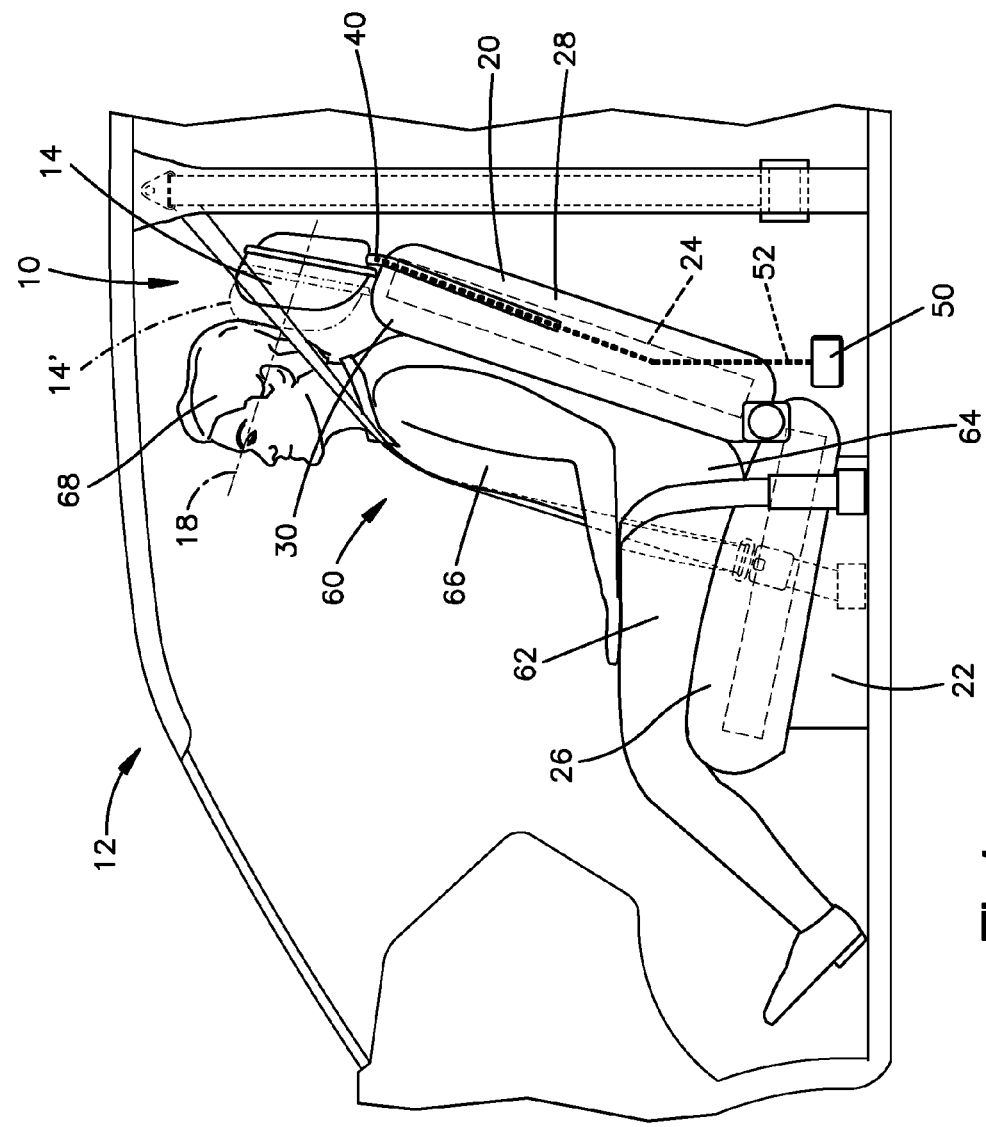
FIG. 1 is a schematic illustration of a vehicle that includes an apparatus for helping to protect an occupant of a vehicle seat, according to the present invention.

The present invention relates to an apparatus for helping to protect an occupant of a vehicle. More particularly, referring to FIG. 1, the apparatus 10 comprises a vehicle occupant protection device in the form of an active head restraint 14 supported on a seat 20 of a vehicle 12. As shown in FIG. 1, the vehicle seat 20 includes a seat base 22 mounted to the vehicle 12. A seat frame 24 mounted to the seat base 22 supports a seat cushion 26 and a seat back 28. The seat back 28 is adjustable to incline or decline relative to the seat base 22 and cushion 26.

Figure 2:
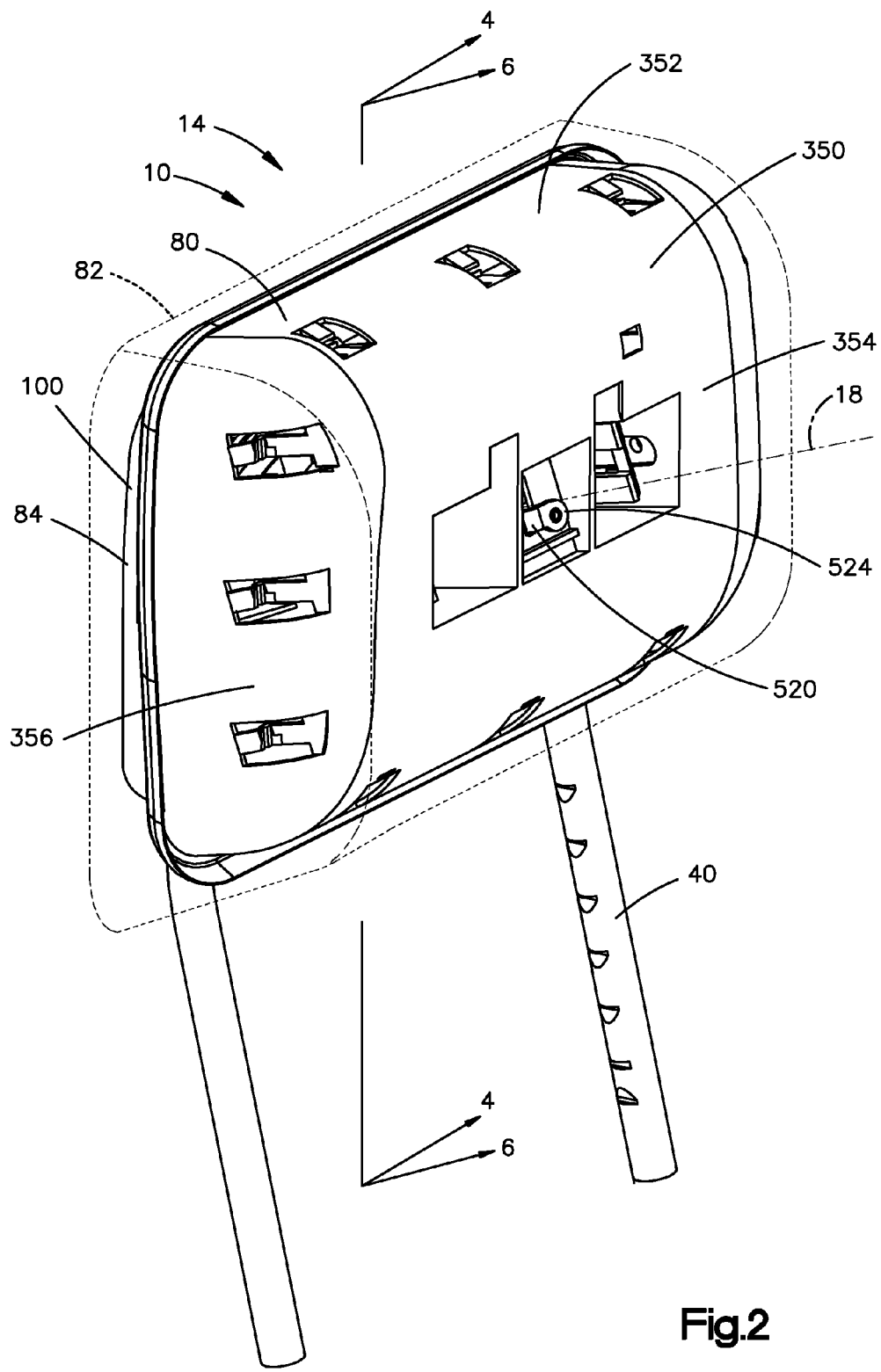
FIG. 2 is a perspective view of a portion of the apparatus, illustrating the apparatus in a non-deployed condition.

The active head restraint 14 is supported on the seat back 28 via a mount in the form of one or more support rods 40 connected to the seat frame 24. The active head restraint 14 is supported in a position generally adjacent or above an upper end portion 30 of the seat back 28. The active head restraint 14 has a normal, non-deployed condition illustrated generally in solid lines in FIG. 1 (see also FIGS. 2 and 4). The active head restraint 14 is actuatable to a deployed condition illustrated generally in dashed lines at 14' in FIG. 1 (see also FIGS. 3 and 5).

The apparatus 10 includes a sensor 50, illustrated schematically at in FIG. 1, for sensing an event for which deployment of the active head restraint 14 is desired, such as an impact or collision. In particular, the sensor 50 may be operative to sense a rear impact of the vehicle 12. The sensor 50 may comprise one or more sensing devices (not shown), such as accelerometers, one or more controllers (not shown), or a combination of sensing devices and controllers located local to or remote from the active head restraint 14. The active head restraint 14 is operatively connected to the sensor via lead wires 52.

The sensor may comprise a standalone unit dedicated to sensing only conditions for which deployment of the active head restraint 14 is desired, such as a rear vehicle impact. Alternatively, the sensor 50 may be integrated with a vehicle restraint control module that controls the active head restraint 14 and other vehicle occupant protection devices, such as air bags, seat belts, inflatable curtains, and knee bolsters. In this configuration, the control module of which the sensor 50 forms a portion may actuate the active head restraint 14 or other vehicle occupant protection devices in response to the sensed event. For example, the control module may actuate the active head restraint 14 and other vehicle occupant protection devices in various combinations in response to different sensed conditions, such as a front impact, side impact, rear impact, offset impact, or a vehicle rollover.

The seat 20 may support a vehicle occupant 60. In the embodiment illustrated in FIG. 1, the apparatus 10 is associated with the vehicle seat at a passenger side first row position in the vehicle 12. The apparatus could, however, be associated with a seat in an alternative position (not shown) in the vehicle 12, such as a driver position or a rearward seat position (e.g., $2^{nd}$ row, $3^{rd}$ row, etc.).

In the normally seated position illustrated in FIG. 1, the occupant's upper legs 62 and buttocks/pelvis 64 are supported on the seat cushion 26, and the occupant's torso 66 is supported by and rests against the seat back 28. As shown in FIG. 1, in the normally seated position, the occupant's head 68 may be positioned forward of the active head restraint 14.

Referring to FIGS. 2-5, the active head restraint 14 includes a head restraint core 80 upon which a cover 82 (shown in dashed lines in FIG. 2 only) is supported. The cover 82 may have any suitable configuration or construction. For example, the cover 82 may include one or more layers of energy absorbing material, such as foam padding, covered by an outer upholstery layer of material, such a fabric material, a leather material, or a synthetic material. On certain portions of the head restraint core 80, such as a rear portion 84, the cover 82 may have a different construction. For example, the cover 82 may be constructed of a plastic material on the rear portion 84 of the head restraint core 80.

The head restraint core 80 includes a rear cover 100, a base frame 150 that is connected to or otherwise supported on the rear cover, and a cushion carrier 350 supported on the base frame for sliding movement along a deployment axis 18. A drive spring 500 biases the cushion carrier 350 to move relative to the base frame 150 along the deployment axis 18 toward the deployed condition (see 14' in FIG. 1). As shown in the figures, the deployment axis 18 extends generally diagonally, upward and forward toward the occupant's head 68 as viewed in FIG. 1.

Figure 7:
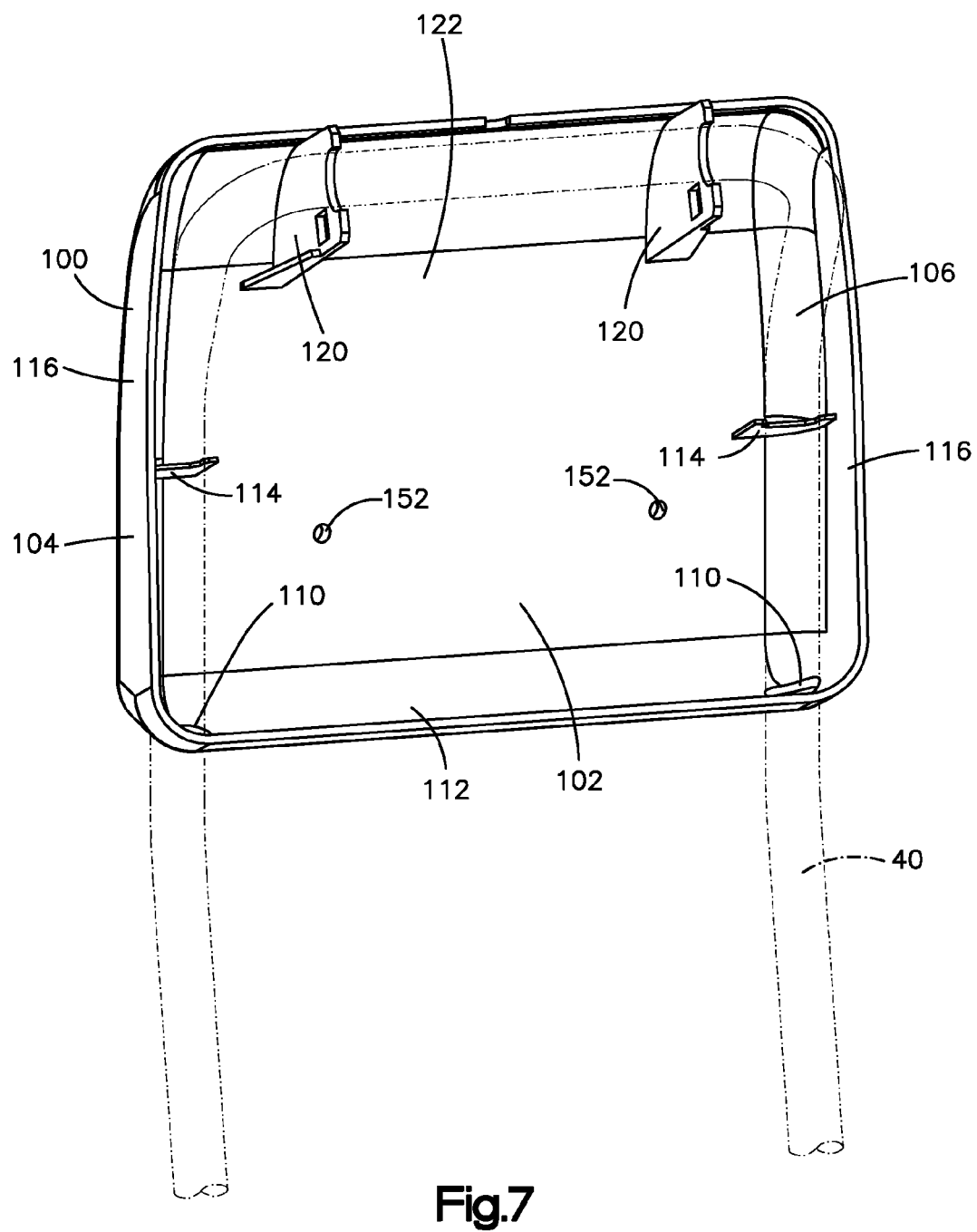
FIGS. 7-9 are perspective views of certain portions of the apparatus.

As best shown in FIG. 7, the rear cover 100 is connectable with the support rod 40 to thereby connect the head restraint core 80 to the support rod. The support rod 40 comprises a single elongated piece of a material, such as a metal rod or tube, that is bent or otherwise formed to define an inverted, generally U-shaped portion that engages and is secured to the rear cover 100 and base frame 150 of the head restraint core 80, as described below. Alternative configurations, such as two separate interconnected rods, could also be used to form the support rod 40.

The rear cover 100 illustrated in FIG. 7 is formed as a single piece of material, such as molded plastic. The rear cover 100 includes a generally flat, planar base wall 102 and a peripheral side wall 104 that extends transverse to the base wall along a periphery 106 of the base wall. The rear cover 100 also includes a pair of openings 110 spaced from each other along a lower portion 112 of the side wall 104. The rear cover 100 also includes a pair of first support portions 114 that are positioned spaced from each other adjacent opposite lateral portions 116 of the side wall 104. Each of the first support portions 114 is aligned with a respective one of the openings 110 in the lower portion 112 of the side wall 104. The rear cover 100 further includes a pair of second support portions 120 that are positioned spaced from each other along an upper portion 122 of the side wall 104.

In the illustrated embodiment, the rear cover 100 and base frame 150 are separate pieces connectable with each other via means (not shown) such as interlocking (e.g., snap-fit) portions, fasteners, or a combination of interlocking portions and fasteners. Alternatively, the rear cover 100 and base frame 150 could be formed as a single integrated component, e.g., via molding.

In the illustrated embodiment, the base frame 150 is connected to the rear cover 100 by known means (not shown), such as fasteners installed through respective fastener openings 152 in the base frame 150 and rear cover 100. The support rod 40 extends through the openings in the rear cover 100 and is positioned against the first and second support portions 114 and 120 of the rear cover. With the support rod 40 in the position shown in FIG. 7, the base frame 150 is connected to the rear cover 100. When the base frame 150 is connected to the rear cover 100, the support rod 40 becomes clamped between a support rod receiving portion 154 of the base frame 150 and the second support portions 120 of the rear cover 100. This connection is effective to secure the support rod 40 and form an assemblage of the support rod, rear cover 100, and base frame 150.

The base frame 150 includes a base portion 160 and a track portion 180. The base portion 160 abuts the rear cover 100 and is secured to the rear cover. The track portion 180 extends from the base portion 160 away from the rear cover 100. The track portion 180 supports the cushion carrier 350 for sliding movement along the deployment axis 18.

The base portion 160 of the base frame 150 includes a central portion 162 and flange portions 164 that extend laterally from opposite sides of the central portion. The flange portions 164 include base portions 166 that abut the rear cover 100 and through which fastener openings 152 extend. The fastener openings 152 are configured to receive fasteners (not shown) for securing the base frame 150 to the rear cover 100.

Reinforcing portions 170 extend between the base portions 166 and the track portion 180 and help improve the strength and structural integrity of the base frame 150.

Figure 6:
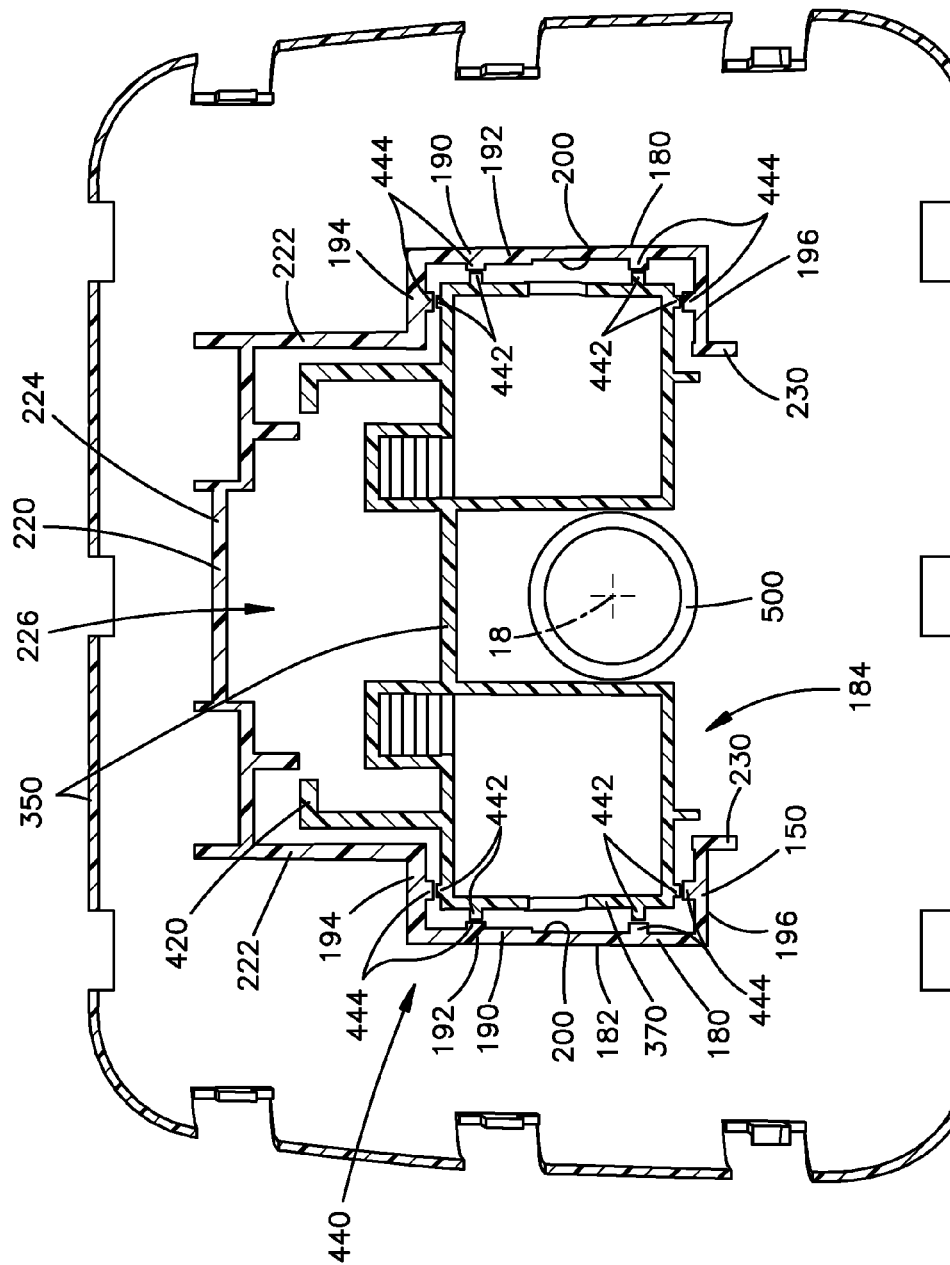
FIG. 6 is a sectional view taken generally along line 6-6 in FIG. 2, with certain portions omitted for clarity.
Figure 8:
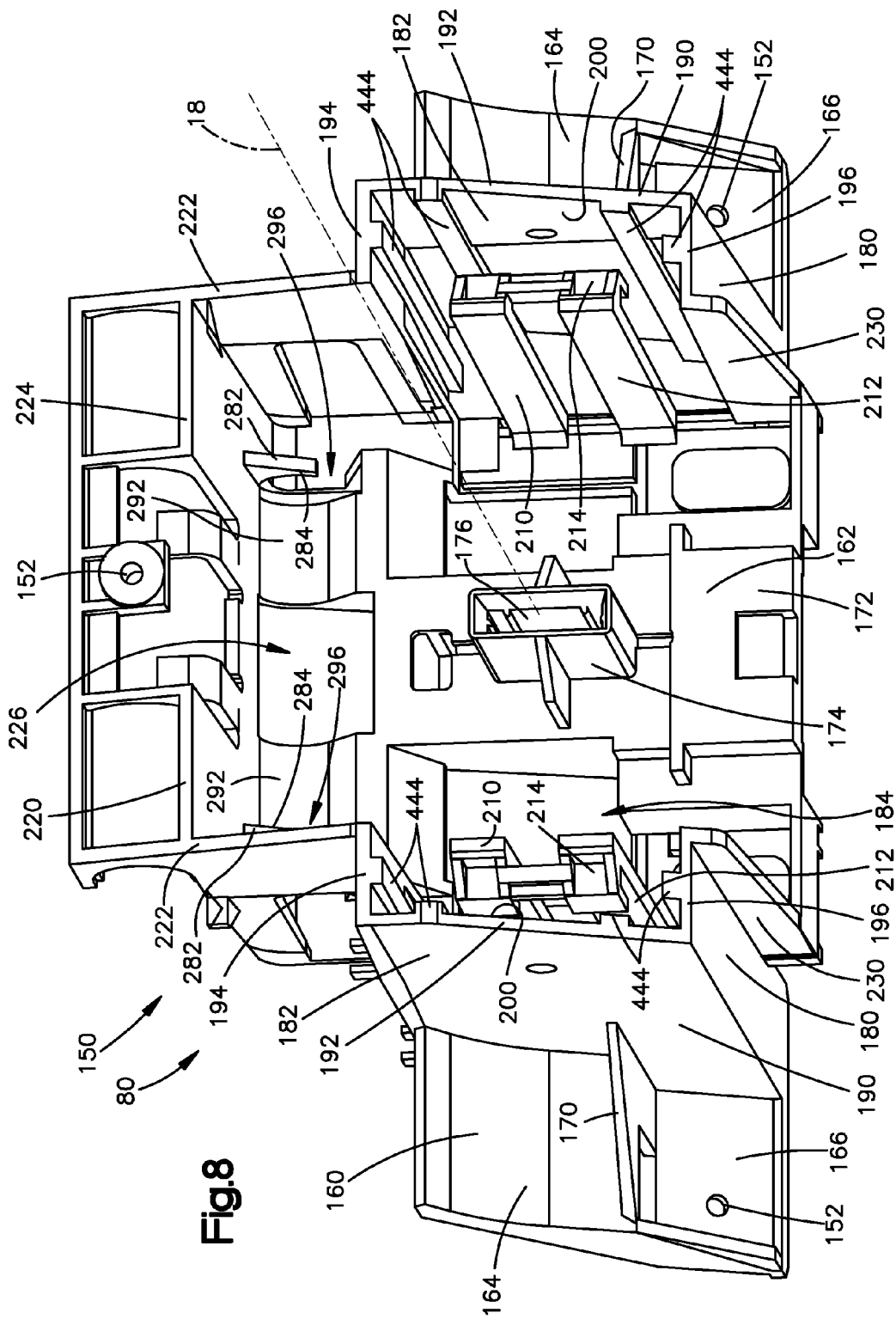

The central portion 162 of the base frame 150 includes an actuator support portion 172 positioned at a lower extent of the central portion, as viewed in FIGS. 6 and 8. The actuator support portion 172 is configured to receive and mate with an actuator associated with a release mechanism (not shown in FIGS. 6 and 8) that is discussed below in greater detail. The shape and form of the actuator support portion 172 may correspond to the shape and form of the actuator.

The central portion 162 of the base frame 150 also includes a spring support portion 174 for receiving an end portion of the drive spring 500 of the head restraint core 80. The spring support portion 174 is generally elongated and rectangular in shape and is centered generally on the deployment axis 18. The spring support portion 174 projects from the central portion 162 along the deployment axis 18. The spring support portion includes a slot 166 for receiving a tongue portion of a release latch mechanism (not shown in FIGS. 6 and 8) of the head restraint core 80.

The track portion 180 of the base frame 150 includes a portion that defines a fixed track member 182 of the head restraint core 80. The fixed track member 182 extends away from the base wall 102 of the rear cover 100 in a direction generally parallel to the deployment axis 18 of the head restraint core 80. The fixed track member 182 defines a generally rectangular or rectilinear channel 184. The fixed track member 182 includes spaced beam portions 190 that extend generally parallel to the deployment axis 18. The beam portions 190 have generally squared C-shaped configurations, each including a vertical member 192, an upper cross-member 194, and a lower cross-member 196. The beam portions 190 thus serve in the manner of a C-shaped beam to help improve the strength and rigidity of the fixed track member 182.

The beam portions 190 are spaced laterally from each other and oriented such that opposing surfaces 200 of the beams, defined by respective surfaces of the vertical members 192 and the cross-members 194 and 196, help define opposite lateral extents of the channel 184. The opposing surfaces 200 have a squared C-shaped configuration, thus giving the channel 184 its generally rectangular or rectilinear configuration. Latch members 210 positioned in the channel 184 adjacent each beam portion 190 have leg portions 212 that extend away from the central portion 162 of the base frame 150 in a direction generally parallel to the deployment axis 18. Each latch member 210 has a terminal latch hook portion 214 that projects laterally from the leg portion 212 toward the vertical member 192 of the adjacent beam portion 190. The latch members 210 have generally resilient configurations and can be deflected toward or away from the deployment axis 18.

The beam portions 190 are interconnected with each other via an upper transverse portion 220 of the fixed track member 182. The upper transverse portion 220 includes respective vertical members 222 that extend vertically upward, as viewed in FIGS. 6 and 8, from the upper cross-members 194 of the beam portions 190. The upper transverse portion 220 also includes a cross member 224 that extends between and interconnects the vertical members 222. The upper transverse portion 220 helps define a lock channel 226. The fixed track member 182 may also include lower reinforcing members 230 that extend vertically downward, as viewed in FIGS. 6 and 8, from the lower cross-members 196 of the beam portions 190.

The beam portions 190, upper transverse portion 220, lower reinforcing members 230, or any combination of these elements, may be connected to and extend from the base wall 102 of the rear cover 100 (see, e.g., FIG. 7). This may be achieved, for example, by molding the beam portions 190, the upper transverse portion 220, the lower reinforcing members 230, or any combination of these elements with the base wall 102 as a single piece of molded plastic material.

The lock channel 226 is configured to receive and support a non-return pawl 250. Referring to FIGS. 4, 5, 8, and 12, the non-return pawl 250 includes spaced elongated pawl arm portions 252 interconnected by a central cross member 254 and a front cross member 256. A reset lever 260 extends perpendicularly from the central cross member 254 in a direction generally upward as viewed in FIGS. 4, 5, and 12.

Figure 4:
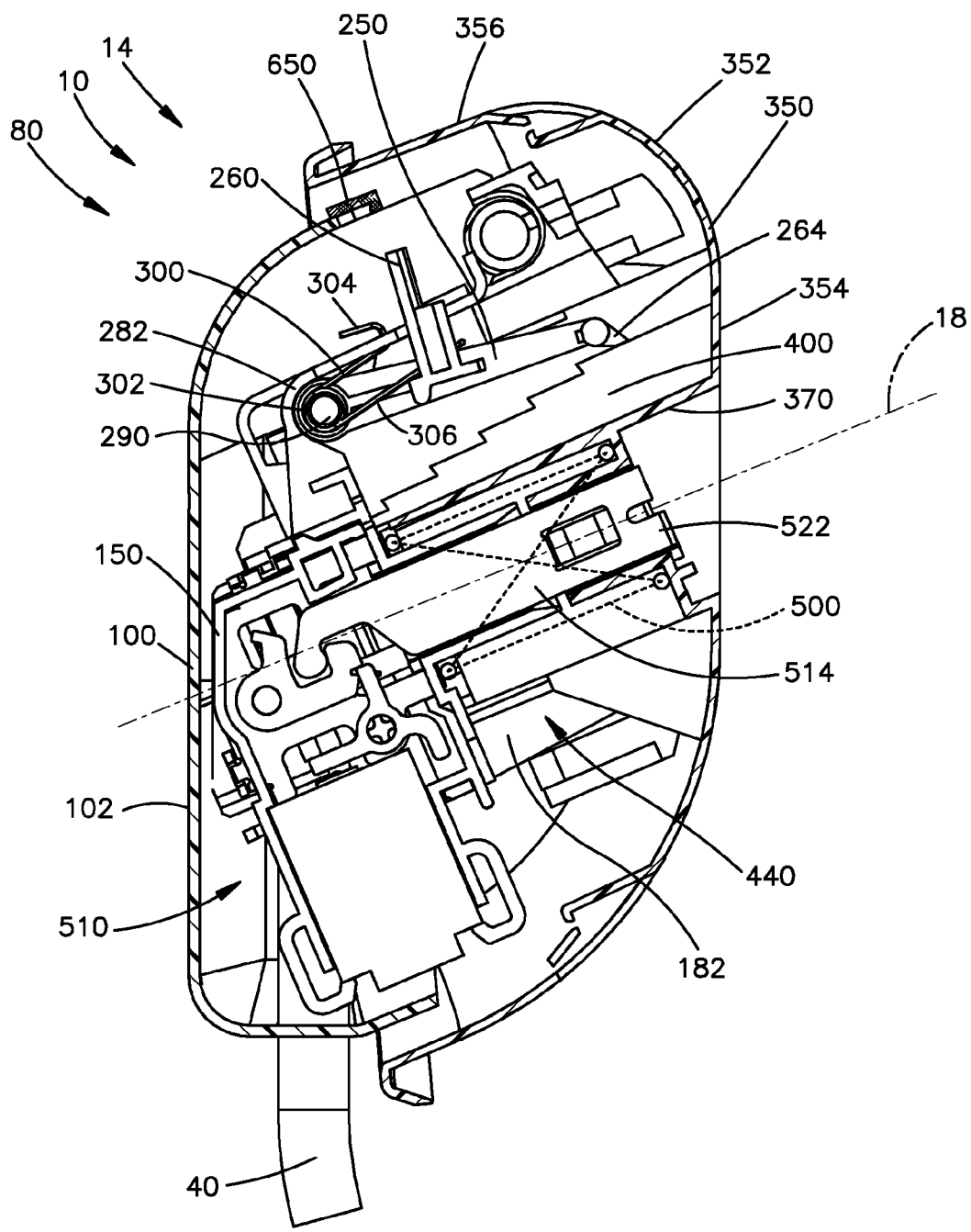
FIG. 4 is a sectional view taken generally along line 4-4 in FIG. 2, with certain portions omitted for clarity.
Figure 5:
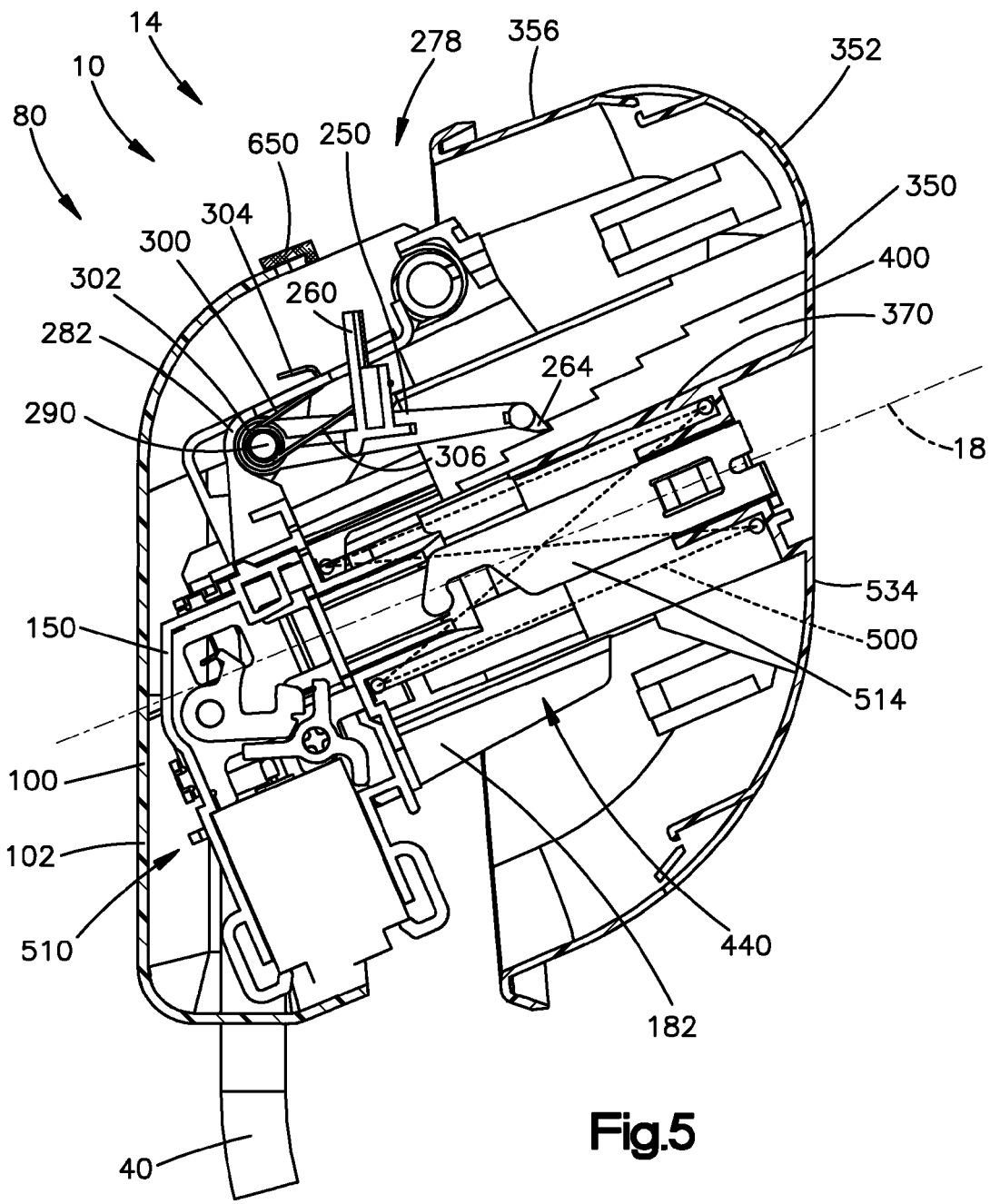
FIG. 5 is a sectional view taken generally along line 5-5 in FIG. 3, with certain portions omitted for clarity.

Each pawl arm portion 252 includes a terminal end portion 262 that defines a rack engaging portion 264 of the non-return pawl 250. The rack engaging portions 264 extend angularly from the pawl arm portions 252 in directions generally downward and forward as viewed in FIGS. 4, 5, and 12. The rack engaging portions 264 include a generally planar, downwardly facing lower rack engaging surface 270 and a generally planar, forward facing stop surface 272 that intersects the rack engaging surface at an acute angle. As best shown in FIGS. 4 and 5, the rack engaging portions 264 project generally downward from the pawl arm portions 252 such that the rack engaging portions are positioned offset from and vertically below a lower surface 274 of the pawl arm portions.

Each pawl arm portion 252 also includes a terminal end portion opposite the rack engaging portions that defines a pivot portion 276 of the non-return pawl 250. Each pivot portion 276 includes generally rounded pivot surfaces 280 that are received in and engage corresponding non-return latch receiving portions 282 of the base frame 150 (see FIG. 8). The pivot surfaces 280 are centered on a pivot axis 284 of the non-return pawl 250. Each pivot portion 276 also includes a retention member 286 that projects laterally outward from an outer surface 288 of the pivot portion. The retention portions 286 have a generally elongated tapered configuration and extend generally parallel to the length of the pawl arms 252.

The non-return pawl 250 also includes a spring receiving portion 290 that projects inward from one of the pivot portions toward the other of the pivot portions 280. The spring receiving portion 290 has a generally cylindrical configuration and is centered along with the pivot portions 280 on the pivot axis 284 of the non-return pawl 250. The non-return pawl 250 further includes a reset pin 292 that projects laterally from an outer surface of one of the pawl arm portions 252 adjacent or near the rack engaging portion 264. The reset pin 292 has a generally cylindrical configuration and is aligned with the front cross member 256.

To assemble the non-return pawl 250 with the base frame 150, the pivot portions 280 are installed in the corresponding non-return latch receiving portions 282 of the base frame 150 (see FIG. 8). As shown in FIG. 8, the non-return latch receiving portions 282 include a cylindrical pawl receiving surface 292 upon which the pivot surfaces 280 of the pawl arm portions 252 are held and supported for pivoting movement about the pivot axis 284. As the non-return pawl 250 pivots about the pivot axis 284, the pivot portions 280 slide on the pawl receiving surface 292.

The non-return pawl receiving portions 282 also include lateral retention walls 294 that maintain the lateral position of the non-return pawl 250. The retention walls 294 leave a gap or opening 296 through which the retention portions 286 of the pawl arm portions 252 extend when the non-return pawl 250 is installed. To do this, the non-return pawl 250 is installed at an angle relative to the base frame 150 that falls within a predetermined range so that the elongated retention portions pass through the openings 296. Once installed, the non-return pawl 250 is pivoted upward to a position such that the retention portions 286 are blocked from removal by the retention walls 294, thus locking the non-return pawl 250 in the non-return pawl receiving portion 282 of the base frame 150. Thereafter, when a sliding track member 370 of the cushion carrier 350 is installed in the fixed track member 182 of the base frame 150, the non-return pawl 250 is prevented from pivoting to a position where it can be removed from the non-return pawl receiving portion 282.

In the installed condition (see FIGS. 4 and 5), a non-return pawl biasing coil spring 300 is installed. A central coil portion 302 of the coil spring 300 is installed on the spring receiving portion 290. A first end portion 304 of the coil spring 300 is secured or placed in engagement with the base frame 150 and a second end portion 306 is secured or placed in engagement with the non-return pawl 250. The coil spring 300 biases the non-return pawl 250 such that rack engaging portions 264 are urged into engagement with rack latch portions 402 on the cushion carrier 350.

Referring to FIGS. 2-5 and 9, the cushion carrier 350 includes a cushion support portion 352 with a front wall 354 and a side wall 356 that projects from the front wall about a periphery of the front wall. The side wall 356 includes a series of connecting portions 360 spaced about the periphery of the cushion carrier 350 for securing the cover 82 (see FIGS. 2 and 3) to the cushion carrier 350.

The cushion carrier 350 includes a portion that defines a sliding track member 370 of the head restraint core 80. For example, the sliding track member 370 may be formed integrally with the cushion carrier 350, e.g., via molding. Alternatively, the sliding track member 370 could be formed as a piece separate from and connectable with the cushion carrier 350, e.g., via fasteners or a snap-fit that connects the sliding track member to the front wall 354 of the cushion carrier.

Figure 9:
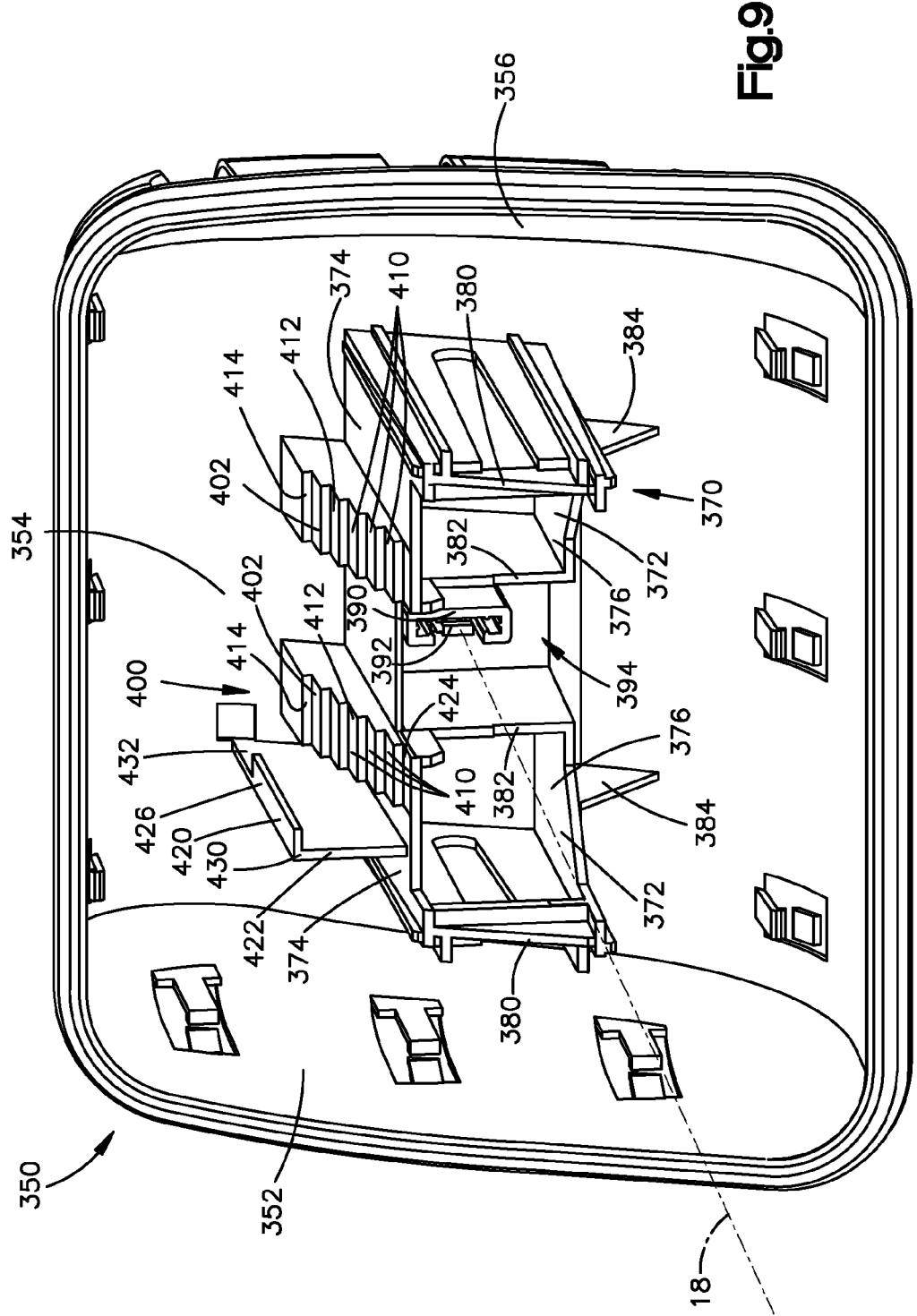

The sliding track member 370 extends away from the front wall 354 of the cushion carrier 350 along the deployment axis 18 of the head restraint core 80. As best shown in FIGS. 6 and 9, the sliding track member 370 has a generally rectangular configuration and includes two generally rectangular box-shaped sliding frames 372 (FIG. 9) spaced laterally from each other. The sliding frames 372 extend generally parallel to the deployment axis 18. Each sliding frame 372 includes upper and lower walls 374 and 376, respectively, that extend generally horizontally (as viewed in FIG. 6) and lateral end walls 380 and 382, respectively, that extend generally vertically (as viewed in FIG. 6). The end walls 380 and 382 extend between and interconnect the upper and lower walls 374 and 376. The sliding frames 372 thus have a generally closed configuration, which helps improve the strength and rigidity of the sliding track member 370.

The sliding track member 370 may also include lower reinforcing members 384 that extend vertically downward from each lower wall 376 of the sliding frame 372. The reinforcing members 384 provide a corner brace between the lower walls 376 and the front wall 354 of the cushion carrier 350. The upper walls 374, lower walls 376, end walls 380 and 382, and reinforcing portions 384, or any combination of these elements, may be connected to and extend from the front wall 354 of the cushion carrier 350. This may be achieved, for example, by forming the upper wall 374, lower wall 376, end walls 380 and 382, reinforcing portions 384, or any combination of these elements with the front wall 354 as a single piece of molded plastic material.

The cushion carrier 350 also includes a spring support portion 390 for receiving an end portion of the drive spring 500 opposite the end portion received by the spring support portion 174 of the base frame 150. The spring support portion 390 is positioned in a space 394 defined between the sliding frames 372. The spring support portion 390 is centered generally on the deployment axis 18 and projects from the front wall 354 in a direction generally parallel to the deployment axis. The spring support portion 390 has a generally elongated rectangular configuration and includes a slot 392 for receiving the tongue portion of the release latch (not shown in FIGS. 6 and 9).

The cushion carrier 350 further includes a non-return latch portion 400 positioned above the upper walls 374 of the sliding frames 372. The non-return latch portion 400 includes two latch rack portions 402 that are spaced apart from each other, one positioned on the upper wall 374 of one sliding frame 372 and one positioned on the upper wall of the other sliding frame. The latch rack portions 402 have stepped configurations and include a plurality of steps 410 that step upward toward the front wall 354 of the cushion carrier 350. Each step 410 includes a sliding surface 412 and a latching surface 414 that extends transverse to the sliding surface, generally vertically as viewed in FIG. 9.

The non-return latch portion 400 also includes a latch reset guide 420 that projects vertically from the upper wall 374 of the leftmost sliding frame 372 as viewed in FIG. 9. The latch reset guide 420 is positioned just to the left of the leftmost latch rack 402 portion as viewed in FIG. 9. The latch reset guide 420 includes a vertical support wall 422 that intersects and extends from the front wall 354 of the cushion carrier 350 to adjacent or near a terminal latch surface 424 of the adjacent latch rack portion 402. The latch reset guide 420 also includes an overhang portion 426 that extends along a portion of an upper edge portion 430 of the support wall 422 and projects toward the adjacent latch rack portion 402. The overhang portion 426 terminates short of the front wall 354 of the cushion carrier 350, forming a reset gap 432 between the terminal end of the overhang portion and the front wall.

Figure 3:
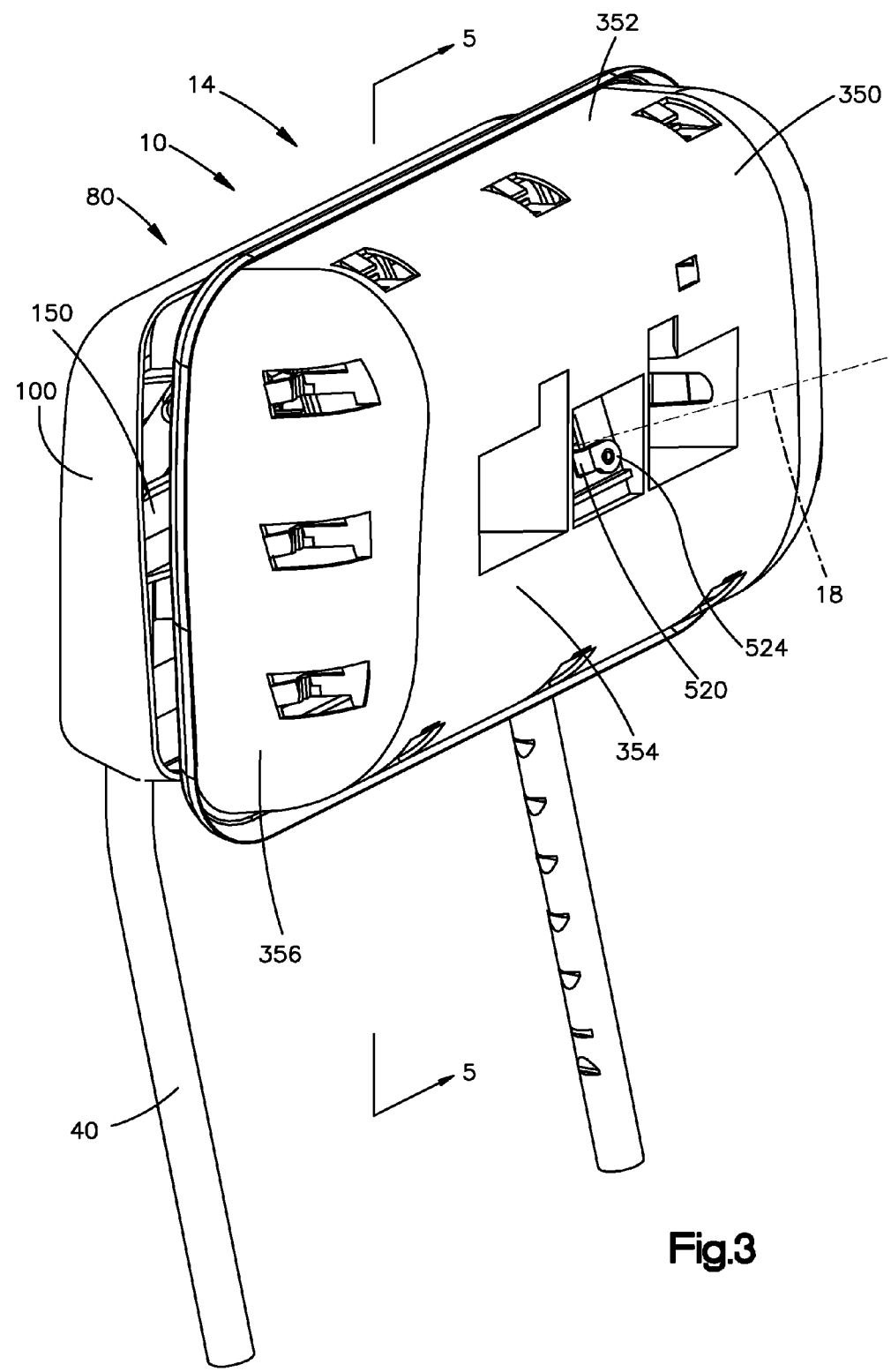
FIG. 3 is a perspective view of a portion of the apparatus, illustrating the apparatus in a deployed condition.

The base frame 150 supports the cushion carrier 350 for movement along the deployment axis 18 in generally fore and aft directions in the vehicle 12 between the non-deployed condition (FIGS. 2 and 4) and the deployed condition (FIGS. 3 and 5). The fixed track member 182 of the base frame 150 and the sliding track member 370 of the cushion carrier 350, in combination, help form a track assembly 440 (FIGS. 2-5) for facilitating movement of the cushion carrier 350 relative to the base frame 150 along the deployment axis 18.

As best shown in FIGS. 6 and 8-10, the sliding track member 370 includes first interface portions 442 that engage second interface 444 portions on the fixed track member 182 and support the sliding track member 370 for sliding movement relative to the fixed track member. A pair of first interface portions 442 are located at each of four corner locations of the sliding frame 372, i.e., at the two intersections between the upper walls 374 and the end walls 380 and 382, and at the two intersections between the lower walls 376 and the end walls 380 and 382.

Figure 10:
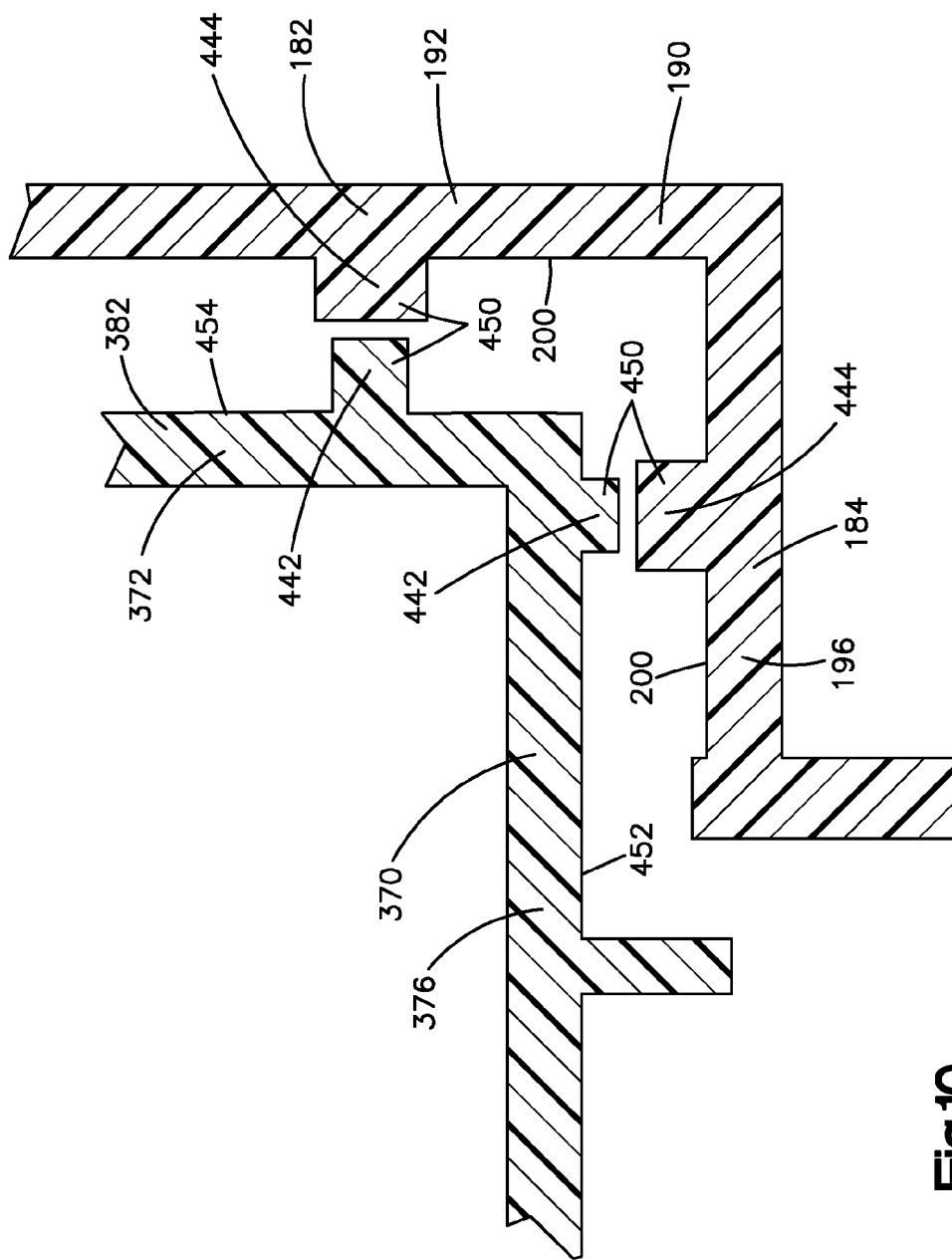
FIG. 10 is a magnified view of a portion of the apparatus of FIG. 6.

A complementary pair of second interface portions 444 are located at each of the four corner locations of the rectangular channel 184 of the fixed track member 182, i.e., at the two intersections between the upper cross-members 194 and the vertical members 192, and at the two intersections between the lower cross-members 196 and the vertical members 192. To illustrate the configuration of the interface portions 442 and 444 in detail, a magnified view of one of the corners of a sliding frame 372 and corresponding rectangular channel 184, particularly the lower right corner as viewed in FIG. 6, is illustrated in FIG. 10.

The first interface portions 442 comprise axially extending beads 450 that extend along the length of the sliding frame 372 and have generally rectangular cross-sections. Alternatively, the beads 450 may have rounded cross-sections, rectangular cross-sections with rounded corners, or rectangular cross-sections with chamfered corners. The direction in which the first interface portions 442 extend is generally parallel to the deployment axis 18. One of the first interface portions 442 projects from a lower surface 452 of the lower wall 376 of the sliding frame 372. Another of the first interface portions 442 projects from an outer surface 454 of the lateral end wall 382 of the sliding frame 372. Those skilled in the art will appreciate that the interface portions associated with intersections at the other corner locations of the sliding frame not shown in FIG. 10 (see FIGS. 6 and 9) project similarly from the lower surface of the lower wall 376, an upper surface of the upper wall 374, and the outer surface of the lateral end walls 380 and 382 at those respective corner locations.

One of the second interface portions 444 projects from the opposing surface 200 of the lower cross-member 196 of the beam portion 190 of the fixed track member 182. Another of the second interface portions 444 projects from the opposing surface 200 of the vertical member 192 of the beam portion 190 of the fixed track member 182. Those skilled in the art will appreciate that the second interface portions 444 associated with intersections at the other corner locations of the fixed track member 182 not shown in FIG. 10 (see FIGS. 6 and 8) project similarly from the opposing surfaces 200 of the lower cross-member 196, the upper cross-member 194, and the vertical member 192, respectively, at those respective corner locations.

As best shown in FIG. 6, the sliding track member 370 is supported for sliding movement within the channel 184 of the fixed track member 182. More particularly, the sliding track member 370 is supported for sliding movement on the fixed track member 182 by the first and second interface portions 442 and 444. The first interface portions 442 on the sliding frame 372 of the sliding track member 370 engage and slide along the corresponding second interface portions 444 of the opposing surfaces 200 of the beam portions 190 of the fixed track member 182. The first and second interface portions 442 and 444 provide engagement between the fixed track member 182 and sliding frame 370 that has a relatively small surface area, which facilitates sliding movement through reduced friction.

In FIG. 10, the interface portion 442 on the lower surface 452 of the sliding frame 370 engages the interface portion 444 on the adjacent surface of the lower cross-member 196. The interface portion 442 on the outer surface 454 of the lateral end wall 382 of the sliding frame 372 likewise engages the interface portion 444 on the adjacent surface of the vertical member 192 of the beam portion 190 of the fixed track member 182. Those skilled in the art will appreciate that the interface portions 444 associated with intersections at the other corner locations of the sliding frame 372 not shown in FIG. 10 (see FIGS. 6, 8, and 9) engage respective interface portions of the fixed track member 182.

Referring to FIG. 4, in the non-deployed condition of the head restraint core 80, the drive spring 500 is arranged in compression within the space 394 defined between the sliding frames 372 and is supported at opposite ends by the respective spring support portions 174 and 390 of the base frame 150 and the cushion carrier 350. The coil of the drive spring 500 has an inside diameter that fits over the spring support portions 174 and 390 with a close fit. The drive spring 500 is configured and arranged in compression to provide a driving or actuating force to move the head restraint core 80 from the non-deployed condition of FIGS. 2 and 4 to the deployed condition of FIGS. 3 and 5.

The drive spring 500 may have various alternative configurations. For example, in one embodiment, the drive spring 500 may comprise a single spring that applies the driving force for actuating the head restraint core 80. As an alternative, the drive spring 500 may comprise two or more springs for applying a driving force that varies during deployment. For instance, the drive spring may comprise two springs, one having a length that is shorter than the other and having a diameter smaller than the other. The shorter, smaller diameter spring could be positioned concentrically with the larger spring within the inside diameter of the larger spring. In this instance, both springs would initially apply the driving force to the cushion carrier 350, with the shorter spring becoming fully extended and ceasing to apply driving force at a predetermined point, thus allowing the longer spring to continue driving the cushion carrier to the fully extended condition. Thus, in this configuration, the cushion carrier 350 may be deployed initially with a first driving force by both springs followed by a second, comparatively lesser or weaker driving force by a single spring.

In another example configuration, the drive spring 500 may not exert the driving force over the full distance of travel of the cushion carrier 350. The drive spring 500 may, for instance, be unconnected to the head restraint core 80 at one end and have a length selected such that the spring becomes fully extended prior to the cushion carrier 350 reaching the fully deployed condition. In this instance, the drive spring 500, when fully extended, would release or "launch" the cushion carrier 350 to travel to the fully deployed condition under its own momentum.

In yet another configuration, the drive spring 500 may comprise a variable rate spring that has a variable force versus displacement characteristics that are selected to achieve the desired deployment characteristics of the head restraint core 80. For example, the drive spring 500 may be selected to have a stiffness that increases proportionally with the degree to which the drive spring is compressed. Thus, in this example, the drive spring 500 would exert a greater degree of force initially, and thereafter exert a lesser degree of force as the spring deploys or decompresses.

The head restraint core 80 of the active head restraint 14 also includes a release mechanism 510. The release mechanism 510 functions to maintain the head restraint core 80 in the non-deployed condition and is actuatable to release the head restraint core to move to the deployed condition under the driving force of the drive spring. The release mechanism 510 may comprise any suitable structure capable of releasably locking the active head restraint 14 in the non-deployed condition. One particular embodiment of the release mechanism 510 is shown in FIGS. 4 and 5 and is illustrated in greater detail in FIGS. 11A-11C.

The release mechanism 510 includes a latch mechanism 512 secured to the base frame 150 and a tongue 514 that is secured to the cushion carrier 350 and moves with the cushion carrier 350 relative to the base frame 150. The tongue 514 is a generally elongated member constructed of a metal plate material or other suitably strong and durable material. The tongue 514 has a main body portion 520 that extends through the slot 392 in the spring support portion 390 of the cushion carrier 350 and through the central space 502 of the drive spring 500.

The tongue 514 has a mounting portion 522 for securing the tongue to the cushion carrier 250. The mounting portion 522 may have any configuration suited to connect the tongue 514 to the cushion carrier 350. For example, as shown in the illustrated embodiment, the metal plate from which the tongue 514 is formed is cut and bent to form mounting flanges 524 that extend perpendicularly from the main body portion 520. In this example configuration, openings 526 in the mounting flanges 524 receive fasteners (not shown) that pass through the openings and connect the mounting portion 522 to the cushion carrier 350.

Opposite the mounting portion 522, the tongue 514 includes a hook portion 530 that engages the latching mechanism 512. The hook portion 530 has a generally rounded terminal end portion 532 that helps define a latch engaging surface 534 of the tongue 514. The latch engaging surface 530 of the end portion 532 defines a recess 536 into which a portion of the latch mechanism 512 enters and engages the latch engaging surface 530.

The latching mechanism 512 includes a latch frame 550 that is secured to the base frame 150. The latch frame 550 supports a latch member 552 for pivotal movement about a first axis 554 and a blocking member 560 supported for pivotal movement about a second axis 562. A double coil spring 564 biases the latch member 552 to pivot about the first axis 554 in a clockwise direction as viewed in FIGS. 11A-11C. The double coil spring 564 also biases the blocking member 560 to pivot about the second axis 562 in a counterclockwise direction as viewed in FIGS. 11A-11C.

The latch member 552 includes a hub portion 570 with a central opening for receiving a first pin 574 supported by the latch frame 550 to thereby connect the latch member to the latch frame. The double coil spring 564 has a first coiled portion 582 that is fit onto the first pin 574. The latch member 552 includes a spring engaging portion 586 that extends or projects from the hub portion 570 in a direction generally vertically as viewed in FIGS. 11A-11C. The spring engaging portion 586 includes surfaces that meet each other at an angle to form a notch 590 that receives a first end portion 580 of the double coil spring 564.

The latch member 552 also includes a tongue engaging portion 592 that receives the hook portion 530 of the tongue 514. The tongue engaging portion 592 extends or projects from the hub portion 570 in a direction generally horizontally to the right as viewed in FIGS. 11A-11C. The tongue engaging portion 592 includes an upwardly extending terminal end portion 594 that defines a tongue engaging surface 596 of the latch member 552. The tongue engaging portion 596 and the spring engaging portion 586 together help define a recess 600 that receives the hook portion 530 of the tongue 514.

Figure 11B:
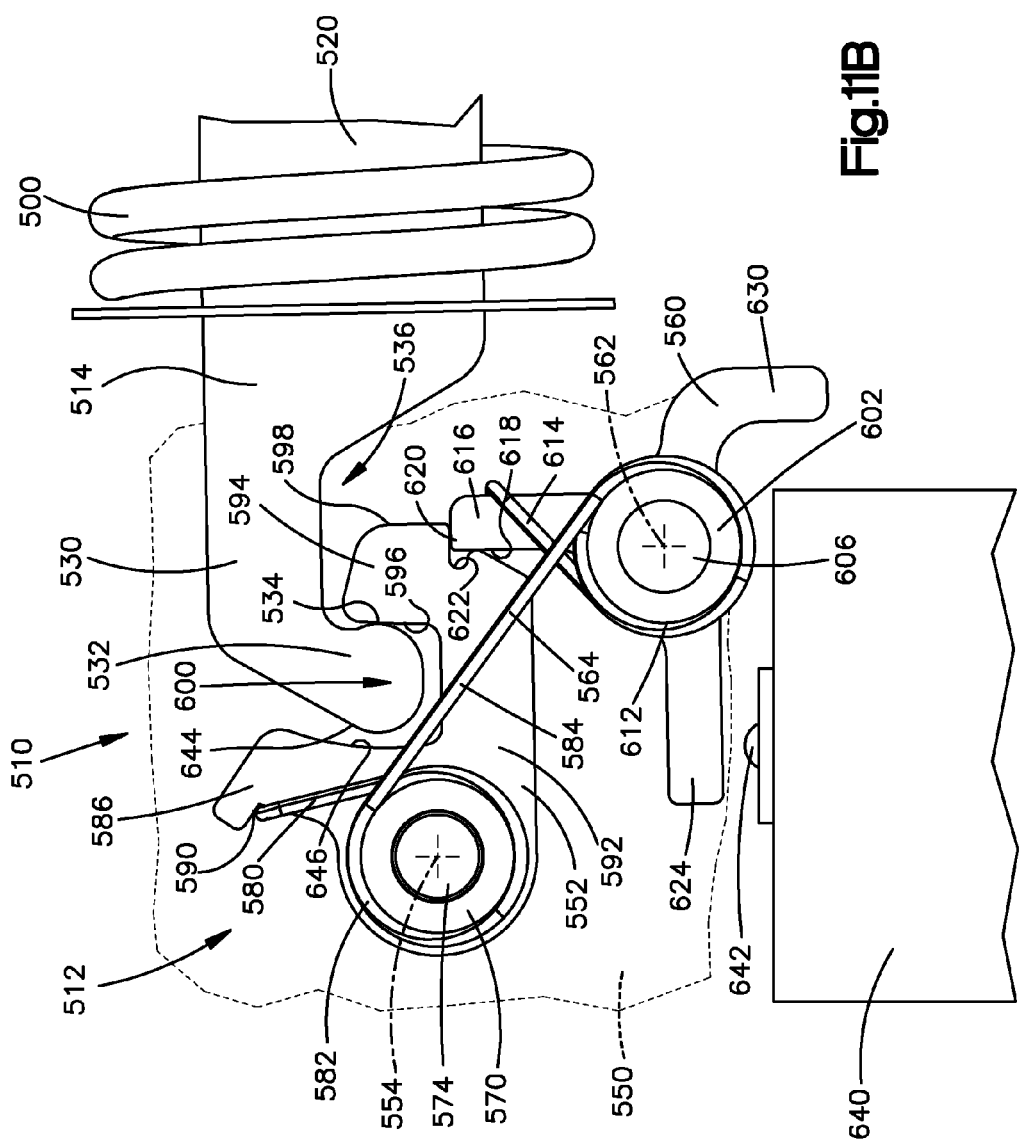
Figure 12:
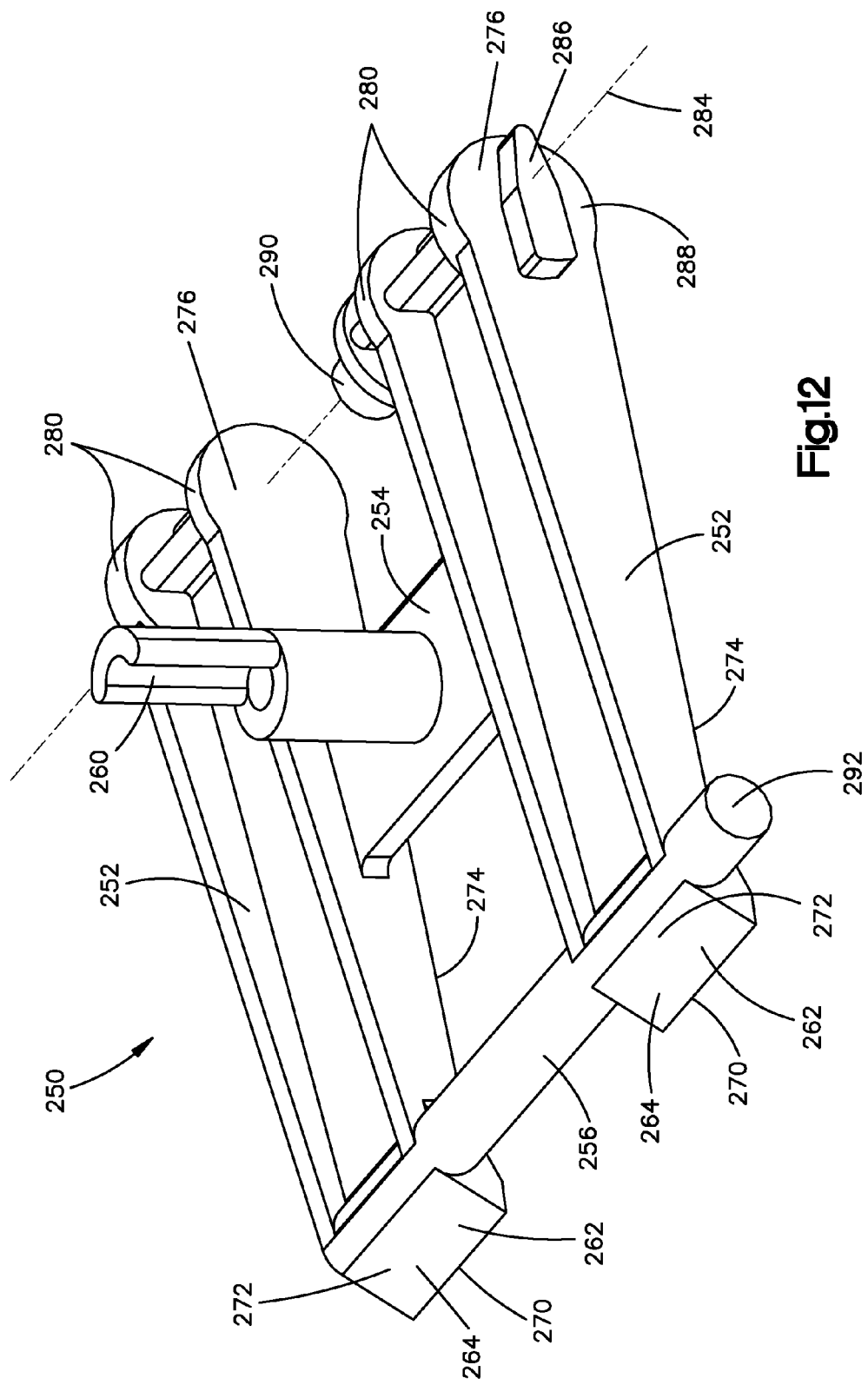
FIG. 12 is a perspective view of a portion of the apparatus.

The blocking member 560 includes a hub portion 602 with a central opening for receiving a second pin 606 supported by the latch frame 550 to thereby connect the blocking member to the latch frame. The double coil spring 564 includes a second coiled portion 612 that is fit onto the second pin 606. The blocking member 560 includes a spring engaging portion 616 in the form of a generally straight arm that extends or projects from the hub portion 602 in a direction generally vertically as viewed in FIGS. 11A-11C. The double coil spring 564 includes a second end portion 614 that engages the spring engaging portion 616 of the blocking member 560. As shown in FIG. 11B, a corner portion 620 of a terminal end of the spring engaging portion 616 is received in and engages a notch 622 formed in the tongue engaging portion 592 of the latch member 552.

The double coil spring 564 has a central connector portion 584 that extends between and connects the first and second coil portions 582 and 612. The central connector portion 584 allows the second pin 606 to serve as a reaction member for the bias of the first coiled portion 582. Conversely, the central connector portion 584 allows the first pin 574 to serve as a reaction member for the bias of the second coiled portion 612.

The blocking member 560 also includes an actuator arm 624 that extends or projects from the hub portion 602 in a direction generally horizontally to the left as viewed in FIGS. 11A-11C. The actuator arm 624 has a generally elongated, straight and rectangular configuration. The blocking member 560 also includes a counterbalance arm 630 that extends or projects from the hub portion 602 in a direction generally to the right as viewed in FIGS. 11A-11C and includes a generally downturned end portion. The counterbalance arm 630 serves to make the blocking member 560 inertially neutral about the axis 562. This helps prevent movement of the vehicle 12, such as those experienced during normal or routine driving conditions, from imparting rotation of the blocking member 560.

The release mechanism 510 further includes an actuator 640 for actuating the latching mechanism 512. The actuator 640 may comprise any actuatable device suited to provide repeatable and reliable actuation of the latching mechanism 512. For example, in the illustrated embodiment, the actuator 640 comprises a solenoid. The solenoid is energizeable to move an actuator pin 642 into engagement with the actuator arm 624 of the blocking member 560. Alternatively, the actuator 640 may comprise a pyrotechnic device (not shown), such as a squib or initiator, arranged in a cylinder to drive a piston that moves a similar actuator pin. As a further alternative, the actuator 640 may comprise an actuatable fastener (not shown), such as a separation bolt, arranged to move or release the blocking member 560. Such an actuatable fastener may, for example, have a configuration similar or identical to any of those shown in U.S. Pat. No. 7,240,917 B2 and U.S. Pat. No. 6,746,044 B2, which are hereby incorporated by reference in their entirety.

The release mechanism 510 is movable between a locking condition (FIGS. 11A and 11B) in which the head restraint core 80 is maintained in the non-deployed condition and a non-locking condition (FIG. 11C) in which the head restraint core is actuated to the deployed condition. In the locking condition, the blocking member 560 maintains the position of the latch member 552 to that illustrated in FIGS. 11A and 11B against the bias of the double coil spring 564. The double coil spring 564 biases the blocking member 560 toward the position illustrated in FIGS. 11A and 11B. In this condition, the corner portion 620 of the spring engaging portion 616 is received in and engages the notch 622 formed in the tongue engaging portion 592 of the latch member 552 and thereby helps maintain the latching mechanism 512 in the locking condition and the head restraint core 80 in the non-deployed condition. In this condition, the tongue engaging portion 592 of the latch member 552 receives the hook portion 530 of the tongue 514 such that the latch engaging surface 534 of the hook portion engages the tongue engaging surface 596 of the latch member 552.

Upon sensing the occurrence of an event for which deployment of the active head restraint 14 is desired, such as a rear impact to the vehicle having a magnitude that meets or exceeds a predetermined threshold, the sensor 50 provides a signal to the actuator 640 of the release mechanism 510 via the lead wires 52. Upon receiving the signal from the sensor 50, the actuator 640 is actuated to actuate the release mechanism 510 to thereby release the cushion carrier 350 to move toward the deployed condition. The active head restraint 14, when in the deployed condition, helps protect the vehicle occupant 60 helping to cushion, restrain, or otherwise prevent certain movements of the occupant's head and neck.

Referring to FIG. 11C, when the actuator 640 is actuated, i.e., energized, the actuator pin 642 is thrust axially into engagement with the actuator arm 624 of the blocking member 560. To help ensure that the actuator 640 actuates the release mechanism 510, the controller 50 may be configured to energize the actuator more than once in rapid succession. As a result, the blocking member 560 pivots clockwise as viewed in FIG. 11C against the bias of the double coil spring 564. When this occurs, the corner portion 620 of the spring engaging portion 616 moves out of the notch 622 in the tongue engaging portion 592 of the latch member 552. This allows the latch member 550 to pivot clockwise as viewed in FIG. 11C under the bias of the double coil spring 564. When this occurs, the tongue engaging portion 592 of the latch member 552 moves out of engagement with the hook portion 530 of the tongue 514, thus releasing the tongue 514 and thus the cushion carrier 350 to move along the deployment axis 18 toward the deployed condition.

When the cushion carrier 350 reaches the end of travel, the cushion carrier engages the latch hook portions 214 of the latch members 210. This prevents the cushion carrier 350 from moving further along the deployment axis 18. Advantageously, the end-of-travel stopping functionality of the head restraint core 80 is configured integrally with the base frame 150, thus eliminating the need for additional parts to provide this function.

Advantageously, the latch engaging surface 534 of the hook portion 530 has a rounded configuration so that the hook portion engages the tongue engaging portion 592 at a point along the latch engaging surface of the hook portion. This helps minimize the contact area between the hook portion 530 and the latch member 552, which helps reduce friction and therefore the resistance to movement of the latch member in releasing the tongue 514. This helps improve, i.e., reduce the delay between actuation of the release mechanism 510 and deployment of the cushion carrier 350.

As the cushion carrier 350 moves toward the deployed condition, the sliding track member 370 slides within the channel 184 along the fixed track member 182, riding on and supported by the second interface portions 444. The first interface portions 442 on the sliding track member 370 engage and slide along the corresponding first interface portions 442 on the beam portions 190. This provides reduced frictional resistance to deployment due to the small surface area over which the interface portions 442 and 444 engage each another.

Also, as shown in FIG. 6, the interface portions 442 and 444 are fit within the channel 184 with a relatively close tolerance, thus helping to prevent the parts from moving relative to each other and rattling during vehicle operation. Those skilled in the art will thus appreciate that this design is advantageous in that it helps prevent such rattling while promoting low frictional resistance to deployment.

Further, the opposed channel, dual C-shaped configuration of the fixed track member 182, coupled with the closed, reinforced boxed configuration of the sliding track member 370, provides relatively high strength construction. Those skilled in the art will appreciate that the fixed and sliding track members 182 and 370, thus configured, exhibit high resistance to torsional deflection or (e.g., twisting) and lateral flexure (e.g., bending).

Figure 13A:
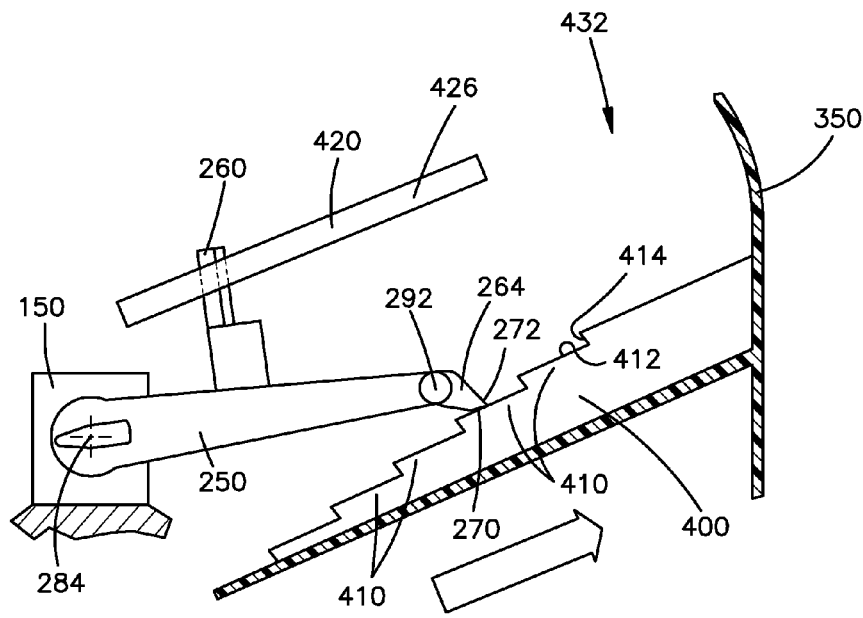
FIGS. 13A-13D illustrate portions of the apparatus in different conditions.
Figure 13B:
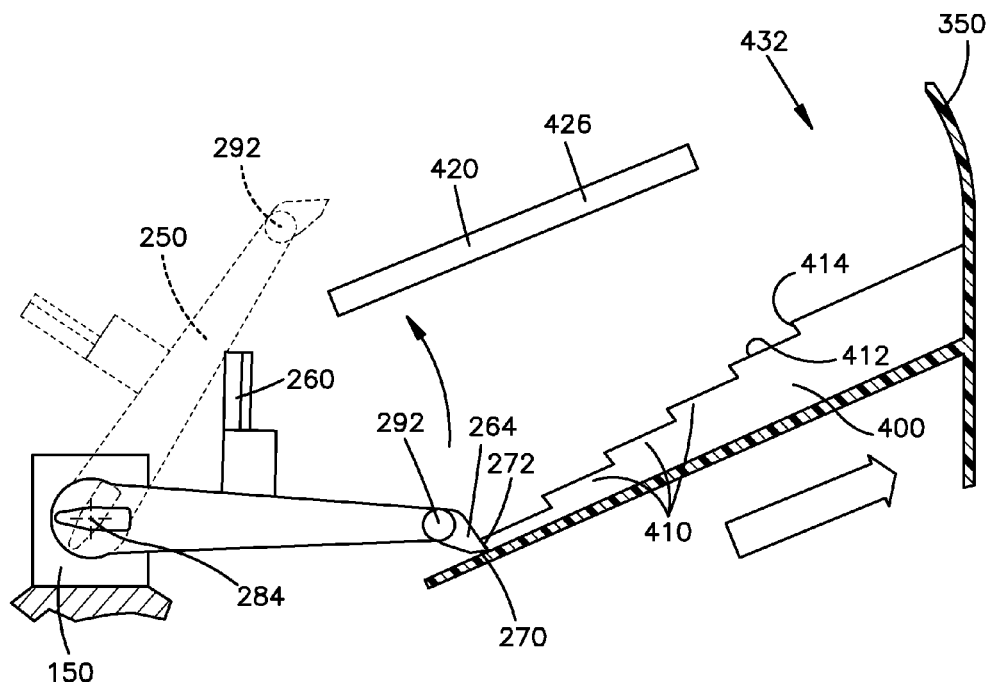

As best illustrated in FIGS. 4-5 and 13A-13D, as the cushion carrier 350 moves in the deployment direction indicated generally by the arrow in FIGS. 13A and 13B, the rack engaging portions 264 of the non-return pawl slide along the steps 410 of the corresponding latch rack portions 400. As the cushion carrier 350 moves toward the deployed condition, the lower rack engaging surfaces 270 of the rack engaging portions 264 slide over the sliding surfaces 412 of the steps 410. If the cushion carrier 350 is moved in a against the bias of the deployment spring 500 toward the non-deployed condition, the stop surfaces 272 of the rack engaging portions 264 engage the latching surfaces 414 of the steps 410 (see FIG. 13B), thus preventing further movement of the cushion carrier 350 against the bias of the deployment spring 500. The non-return mechanism thus helps to maintain the cushion carrier 350 at the forwardmost position achieved during deployment. Advantageously, if the forces urging the cushion carrier 350 opposite the deployment direction are removed, the cushion carrier 350 can resume movement in the deployment direction under the bias of the deployment spring.

The head restraint core 80 may include means for indicating that the head restraint has deployed and that resetting is required. This may be especially advantageous in an instance where the axial distance that cushion carrier 350 deploys is small and not readily noticeable. Such indicating means can be implemented in a variety of manners. As shown in FIGS. 4 and 5, in the illustrated embodiment, a deployment indicator 650 is formed on the rear cover 100 of the head restraint core 80. The deployment indicator 650 may, for example, be formed as a decal, emblem, or paint in a high visibility color and may include a message or symbol indicative of head restraint deployment. The deployment indicator 650 could be positioned in an alternative location, such as on the base frame 150.

When the actuator 640 is de-energized, the actuator pin 642 moves axially out of engagement with the actuator arm 624 of the blocking member 560. The bias of the double coil spring 564, however, maintains the latch member 552 and blocking member 560 in the actuated positions illustrated in FIG. 11C. To reset the release mechanism 510 to the non-deployed condition of FIGS. 11A and 11B, the cushion carrier 350 is moved manually along the deployment axis 18 toward the non-deployed condition against the bias of the drive spring 500. In order to move the cushion carrier 350 manually toward the non-deployed condition, however, it is necessary to move and maintain the non-return pawl 250 in a non-locking condition.

Advantageously, after deployment, the reset lever 260 on the non-return pawl 250 and the reset guide 420 on the cushion carrier 350 combine to aid in resetting the active head restraint 14 to the non-deployed condition. As shown in FIGS. 5 and 13B, when the head restraint core 80 is in the deployed condition, the reset lever 260 is accessible in the space 278 between the cushion carrier 350 and the rear cover 100. This allows the non-return pawl 250 to be urged manually to pivot about the axis 284 and move out of engagement with the latch rack portions 400 so that the cushion carrier 350 can be moved against the spring bias of the drive spring 500 toward the non-deployed condition, as indicated generally by the arrow in FIGS. 13C and 13D.

Figure 13C:
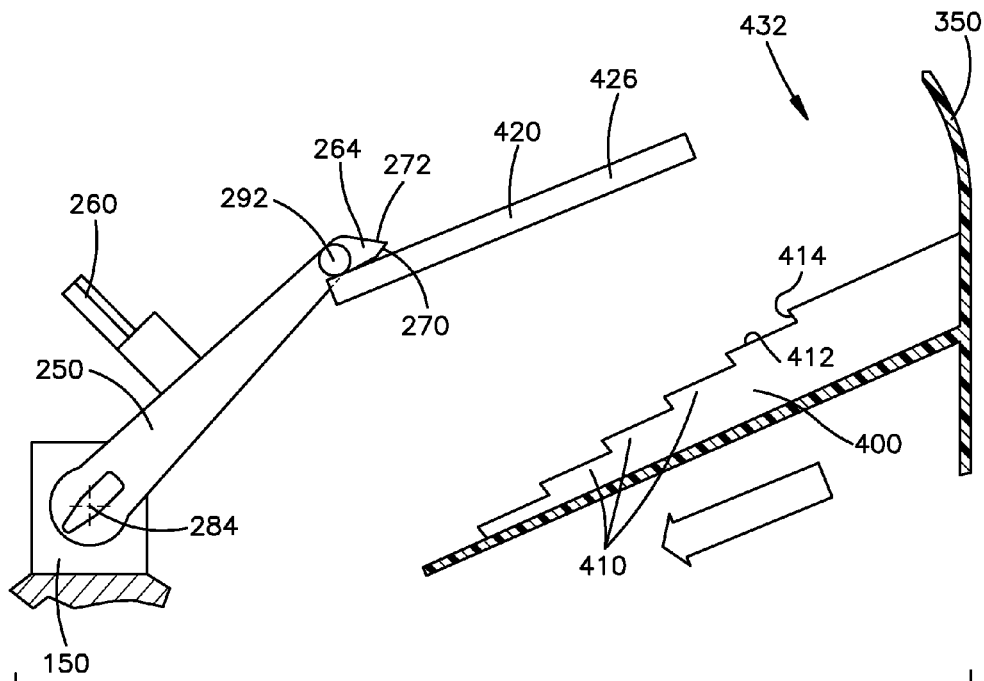
Figure 13D:
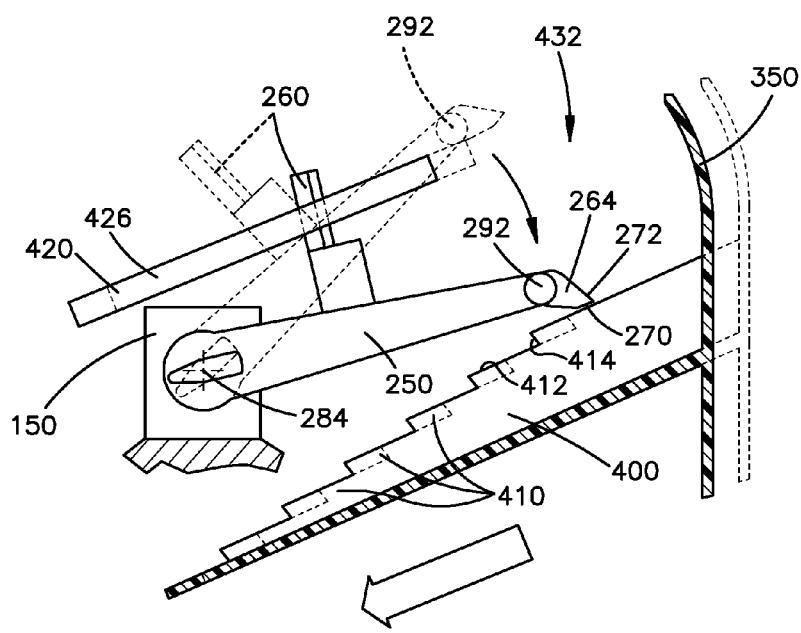

Referring to FIGS. 4, 4, 13C, and 13D, when the cushion carrier 350 is moved a predetermined distance in the deployment direction, the latch reset guide 420 moves relative to the reset pin 292 to a point at which the reset lever 260 can be released. When this occurs, the non-return pawl moves under the bias of the spring 300 so that the reset pin 292 engages the latch reset guide 420, which prevents the rack engaging portions 264 of the non-return pawl 250 from engaging the rack latch portions 402 on the cushion carrier. This allows for continued movement of the cushion carrier 350 toward the non-deployed condition without manually maintaining the non-return pawl 250 out of engagement with the latch rack portions 400.

The cushion carrier 350 can thus be moved further towards the non-deployed condition as access to the space 278 between the cushion carrier 350 and the rear cover 100 is closed-off. When the reset pin 292 clears the latch reset guide 420, the reset pin moves through the reset gap 432 on the overhang portion 426 of the latch reset guide 420, which permits the non-return pawl 250 to pivot into engagement with the latch rack portions 400 under the bias of the spring 300.

Referring to FIGS. 11A-11C, as the cushion carrier 350 is moved manually along the deployment axis 18 toward the non-deployed condition, a reset surface 644 of the hook portion 530 engages a reset surface 646 of the latch member 552, causing the latch member to pivot counterclockwise about the axis 554 as viewed in FIG. 11C against the bias of the double coil spring 564 toward the non-deployed condition. This causes the blocking member 560 to pivot counterclockwise under the bias of the double coil spring 564.

As the blocking member 560 pivots, an outer surface 618 of the spring engaging portion 616 engages and slides over an outer surface 598 of the latch arm 592. As this sliding takes place, that the corner portion 620 of the spring engaging portion 616 approaches the notch 622 in the tongue engaging portion 592. When the latch member 552 reaches the non-deployed condition, the corner portion 620 enters the notch 622, thereby placing the latching mechanism 512 in the non-deployed condition. When the force urging the cushion carrier 350 against the bias of the drive spring 500 is released, the double coil spring 564 biases the latch member 552 and the blocking member 560 against each other, thus maintaining the corner portion 620 engaged in the notch 622. This maintains the release mechanism 510 in the locking condition and thereby maintains the active headrest core 80 in the non-deployed condition of FIGS. 11A and 11B, ready for actuation via the actuator 640 as described above. The active headrest core 80 is thus configured for easy and simplified resetting.

Advantageously, the release mechanism 510, more specifically the tongue 514, latch frame 550, latch member 552, and blocking member 554, may be constructed primarily of metal components that are not as susceptible to fatigue or creep as plastic. This is beneficial since it is these components that withstand the bias of the drive spring 500 while the head restraint core 80 is maintained in the non-deployed condition. Also, in bearing the load of the drive spring 500, the tongue 514 may serve the dual purpose of transferring the driving force to the cushion carrier 350 while also providing lateral or anti-buckling support for the drive spring 500.

From the above description of the invention, those skilled in the art will perceive improvements, changes and modifications. Such improvements, changes and modifications within the skill of the art are intended to be covered by the appended claims.

Having described the invention, the following is claimed:

1. A head restraint for helping to protect an occupant of a vehicle seat, the head restraint comprising:
   a base frame connectable with the vehicle seat; and
   a cushion carrier supported on the base frame by a track assembly that facilitates movement of the cushion carrier relative to the base frame along a deployment axis from a non-deployed condition to a deployed condition, the track assembly comprising:
   a fixed track member that forms a portion of the base frame, the fixed track member comprising spaced axially extending beam portions with opposing surfaces that define a channel between the beam portions; and
   a sliding track member that forms a portion of the cushion carrier, the sliding track member comprising a sliding frame positioned in the channel and having portions positioned in sliding contact with portions on the opposing surfaces defining the channel, wherein the beam portions each have a generally squared C-shaped configuration and are positioned facing each other such that the opposing surfaces provide the channel with a generally rectangular configuration.

2. The head restraint recited in claim 1, further comprising:
   a drive spring for moving the cushion carrier relative to the base frame; and
   a release mechanism responsive to a sensed vehicle condition to release the cushion carrier to move from the non-deployed condition to the deployed condition under the bias of the drive spring, the release mechanism comprising a tongue member connected to the cushion carrier and disposed in a central space defined by the drive spring, the tongue member providing lateral anti-buckling support for the drive spring.

3. The head restraint recited in claim 1, wherein the opposing surfaces defining the channel comprising inward facing portions of the C-shaped beams.

4. The head restraint recited in claim 1, further comprising a drive spring for moving the cushion carrier from the non-deployed condition to the deployed condition, the head restraint comprising a spring housing that houses the drive spring, the spring housing being formed as a part of the sliding track member.

5. The head restraint recited in claim 4, wherein the sliding frame has a boxed rectangular configuration, the spring housing being formed integrally with the sliding frame and being at least partially positioned within a space defined within the boxed rectangular configuration of the sliding frame.

6. The head restraint recited in claim 4, wherein the spring housing has a generally rectangular configuration, the drive spring being housed within a spring cavity defined within the spring housing.

7. The head restraint recited in claim 4, wherein the drive spring comprises plural springs configured and arranged to deploy the cushion carrier initially with a first force and subsequently with a second force, the second force being lesser than the first force.

8. The head restraint recited in claim 1, further comprising a non-return mechanism for maintaining the cushion carrier at a forwardmost position attained during deployment.

9. The head restraint recited in claim 8, wherein the non-return mechanism permits movement of the cushion carrier toward the deployed condition and blocks movement of the cushion carrier away from the deployed condition.

10. The head restraint recited in claim 8, wherein the non-return mechanism comprises:
    a rack arranged on the sliding track member, the rack comprising a plurality of steps;
    a non-return pawl pivotally connected to the base frame, the non-return pawl comprising a pawl portion biased into engagement with the rack;
    the pawl portion comprising a locking surface and a sliding surface, the locking surface engaging locking surfaces of the steps to block movement of the cushion carrier away from the deployed condition, the sliding surface engaging and sliding over sliding surfaces of the steps to permit movement of the cushion carrier toward the deployed condition.

11. The head restraint recited in claim 10, wherein the sliding surfaces of the steps extend generally parallel to the deployment axis.

12. The head restraint recited in claim 10, wherein the non-return pawl further comprises a release lever operable to move the non-return pawl out of engagement with the rack to permit resetting the head restraint by moving the cushion carrier toward a non-deployed condition.

13. The head restraint recited in claim 12, further comprising a guide, the release lever being operable to move the non-return pawl into engagement with the guide, the guide thereafter maintaining the non-return pawl out of engagement with the rack to thereby permit movement of the cushion carrier toward the non-deployed condition without manually maintaining the position of the release lever.

14. The head restraint of claim 13, wherein the guide is integrally formed with the sliding track member.

15. A head restraint for helping to protect an occupant of a vehicle seat, the head restraint comprising:
a base frame connectable with the vehicle seat; and
a cushion carrier supported on the base frame by a track assembly that facilitates movement of the cushion carrier relative to the base frame along a deployment axis from a non-deployed condition to a deployed condition, the track assembly comprising:
a fixed track member that forms a portion of the base frame, the fixed track member comprising spaced axially extending beam portions with opposing surfaces that define a channel between the beam portions; and
a sliding track member that forms a portion of the cushion carrier, the sliding track member comprising a sliding frame positioned in the channel and having portions positioned in sliding contact with portions on the opposing surfaces defining the channel, wherein the sliding frame comprises first interface portions that engage corresponding second interface portions on the opposing surfaces of the beam portions, the first interface portions comprising elongated projections that extend along the length of the sliding frame, the second interface portions comprising elongated projections that extend along the length of the opposing surfaces.

16. The head restraint recited in claim 15, wherein the projections have square cross-sections.

17. The head restraint recited in claim 15, wherein the sliding frame has a boxed rectangular configuration, the interface portions being positioned at each of four corners of the sliding frame.

18. A head restraint for helping to protect an occupant of a vehicle seat, the head restraint comprising:
a base frame connectable with the vehicle seat; and
a cushion carrier supported on the base frame by a track assembly that facilitates movement of the cushion carrier relative to the base frame along a deployment axis from a non-deployed condition to a deployed condition, the track assembly comprising:
a fixed track member that forms a portion of the base frame, the fixed track member comprising spaced axially extending beam portions with opposing surfaces that define a channel between the beam portions; and
a sliding track member that forms a portion of the cushion carrier, the sliding track member comprising a sliding frame positioned in the channel and having portions positioned in sliding contact with portions on the opposing surfaces defining the channel, the head restraint further comprising a release mechanism having a first condition maintaining the cushion carrier in the non-deployed condition, the release mechanism being actuatable to release the cushion carrier to move to the deployed condition, the release mechanism comprising:
a tongue member movable with the cushion carrier;
a latch mechanism operatively connected to the base frame, the latch mechanism comprising a latch member that engages the tongue member to maintain the cushion carrier in the non-deployed condition, and a blocking member that maintains the latch member in engagement with the tongue member; and
an actuator actuatable to move the blocking member to effectuate movement of the latch member out of engagement with the tongue member to thereby release the cushion carrier for movement toward the deployed condition.

19. The head restraint recited in claim 18, wherein the latch mechanism comprises a single, double coil spring for simultaneously biasing both the latch member and the blocking member.

20. The head restraint recited in claim 18, wherein the latch member comprises a tongue engaging portion that engages a hook portion of the tongue member to maintain the cushion carrier in the non-deployed condition.

21. The head restraint recited in claim 18, wherein the tongue member is disposed in a central space defined by a drive spring, the tongue member providing lateral anti-buckling stability for the drive spring.

22. The head restraint recited in claim 18, wherein the actuator comprises a solenoid.

23. The head restraint recited in claim 22, wherein the solenoid is configured for multiple actuations in rapid succession in response to an occurrence of an event for which occupant protection is desired.

24. A head restraint for helping to protect an occupant of a vehicle seat, the head restraint comprising:
a base frame connectable with the vehicle seat; and
a cushion carrier supported on the base frame by a track assembly that facilitates movement of the cushion carrier relative to the base frame along a deployment axis from a non-deployed condition to a deployed condition, the track assembly comprising:
a fixed track member that forms a portion of the base frame, the fixed track member comprising spaced axially extending beam portions with opposing surfaces that define a channel between the beam portions; and
a sliding track member that forms a portion of the cushion carrier, the sliding track member comprising a sliding frame positioned in the channel and having portions positioned in sliding contact with portions on the opposing surfaces defining the channel, the head restraint further comprising indicia for providing a visual indication that the cushion carrier is in the deployed condition, wherein the indicia is hidden from view by the cushion carrier when the cushion carrier is in the non-deployed condition, the indicia being revealed when the cushion carrier moves away from the non-deployed condition.

* * * * *